United States Patent
Kennedy et al.

(10) Patent No.: US 7,433,563 B2
(45) Date of Patent: Oct. 7, 2008

(54) OPTICAL FIBER MICROSCOPY LAUNCH SYSTEM AND METHOD

(75) Inventors: Guy G Kennedy, Underhill, VT (US); David M Warshaw, South Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 202 days.

(21) Appl. No.: 11/441,360

(22) Filed: May 25, 2006

(65) Prior Publication Data
US 2006/0280404 A1 Dec. 14, 2006

Related U.S. Application Data

(60) Provisional application No. 60/684,465, filed on May 25, 2005.

(51) Int. Cl.
*G02B 6/00* (2006.01)
*G02B 6/04* (2006.01)
*G02B 21/06* (2006.01)

(52) U.S. Cl. .......................... 385/49; 385/14; 385/116; 385/901; 359/385; 359/390; 359/396; 250/227.2

(58) Field of Classification Search .................. 385/14, 385/49
See application file for complete search history.

(56) References Cited

U.S. PATENT DOCUMENTS 3,864,019 A * 2/1975 Smolinsky et al. ............ 385/49
3,967,877 A * 7/1976 Heidrich et al. ............... 385/49
3,971,621 A * 7/1976 Albrecht-Buehler ........ 359/390
4,674,846 A * 6/1987 Lippman ..................... 359/385
5,249,077 A * 9/1993 Laronga et al. ............. 359/385
5,598,005 A 1/1997 Wang et al. ............... 250/459.1
5,781,338 A * 7/1998 Kapitza et al. .............. 359/398
6,558,958 B1 5/2003 Pilevar et al. ............... 436/518
2006/0186346 A1* 8/2006 Wei ......................... 250/461.2

OTHER PUBLICATIONS

*Near-Field Scanning Optical Microscopy*; Olympus Microscopy Resource Center: Specialized Microscopy Techniques. http://www.olympusmicro.com/primer/techniques/nearfield/nearfieldprobes.html; as printed May 25, 2006.
*Total Internal Reflection Fluorescence Microscopy. Basic Microscope Configuration*; Olympus Microscopy Resource Center: Specialized Microscopy Techniques. http://www.olympusmicro.com/primer/techniques/fluorescence/tirf/tirfconfiguration.html; as printed Mar. 29, 2005.
*Total Internal Reflection Fluorescence Microscopy. Introduction and Theoretical Aspects*; Olympus Microscopy Resource Center: Specialized Microscopy Techniques. http://www.olympusmicro.com/primer/techniques/fluorescence/tirf/tirfintro.html; as printed Mar. 29, 2005.
*Total Internal Reflection Fluorescence Microscopy. Olympus Application Note*; Olympus Microscopy Resource Center: Specialized Microscopy Techniques. http://www.olympusmicro.com/primer/techniques/fluorescence/tirf/olympusaptirf.html; as printed Mar. 29, 2005.

* cited by examiner

*Primary Examiner*—M. R. Connelly-Cushwa
(74) *Attorney, Agent, or Firm*—Downs Rachlin Martin PLLC

(57) ABSTRACT

A launch system and method for microscopy having an optical fiber positioned proximate a sample slide with an optical fiber mounting element so as to deliver an EMR from a terminal end of the optical fiber across a surface of the sample slide to an opposing side surface at a desired incident angle.

37 Claims, 25 Drawing Sheets

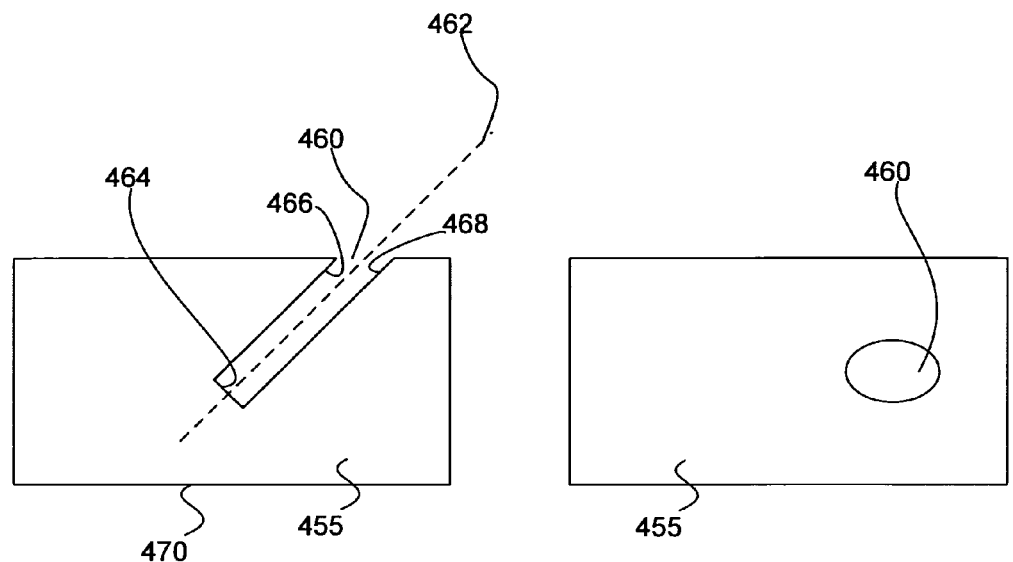
FIG. 4A  FIG. 4B
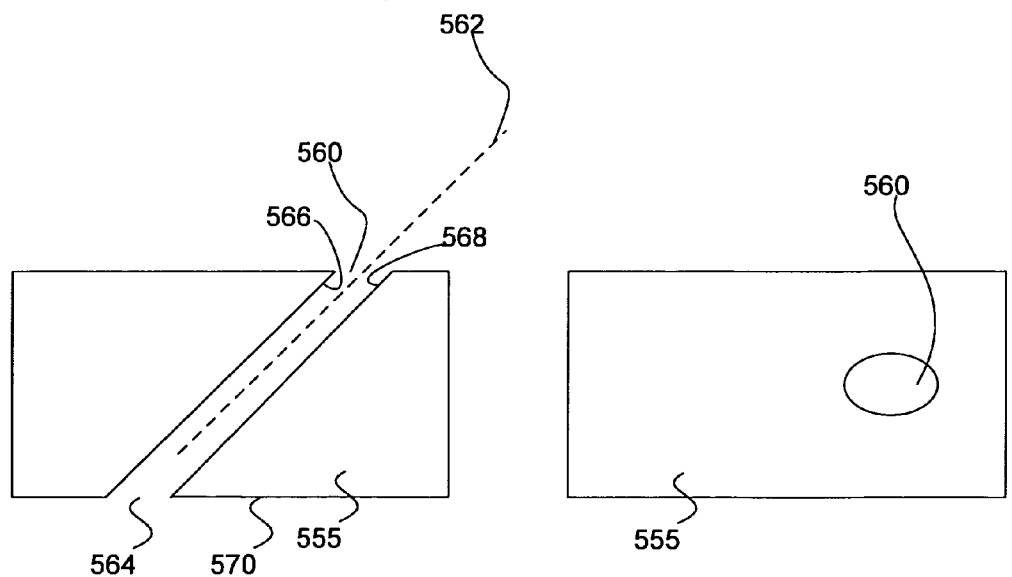
FIG. 5A  FIG. 5B

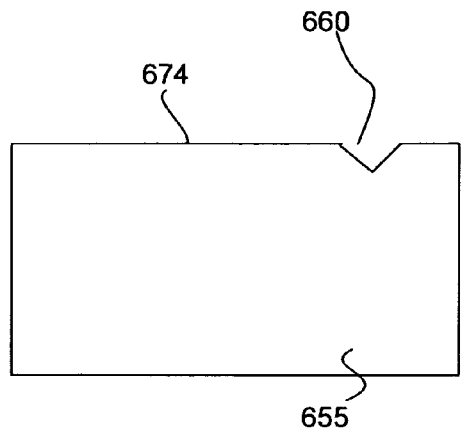
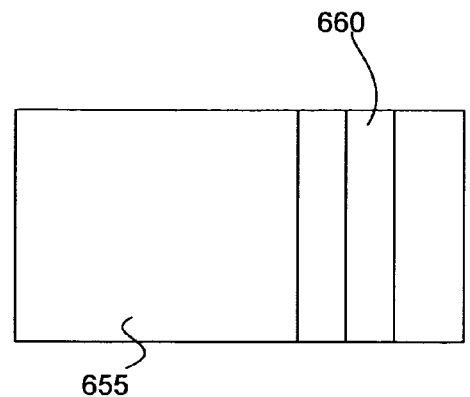
FIG. 6A             FIG. 6B
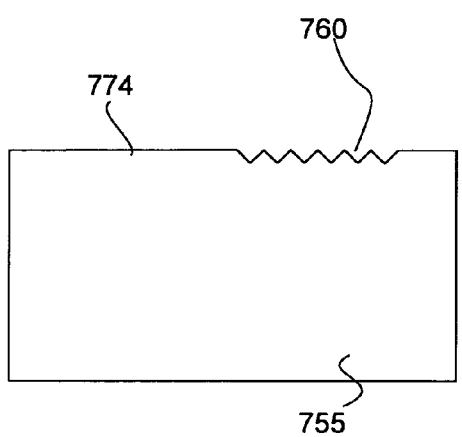
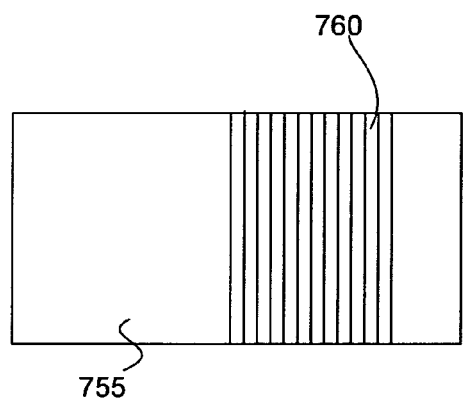
FIG. 7A             FIG. 7B

OPTICAL FIBER MICROSCOPY LAUNCH SYSTEM AND METHOD

RELATED APPLICATION DATA

This application claims the benefit of priority of U.S. Provisional Patent Application Ser. No. 60/684,465, filed May 25, 2005, and titled "Total Internal Reflection System and Method Using Optical Fiber", that is incorporated by reference herein in its entirety.

FIELD OF THE INVENTION

The present invention generally relates to the field of microscopy. In particular, the present invention is directed to an optical fiber microscopy launch system and method.

BACKGROUND

Microscopes vary is size and complexity. Typically, the delivery of excitation and/or illumination radiation to a sample in a microscopy system requires complicated optical components that direct and redirect the radiation from a source through the microscope system to the sample. Translation of the sample (e.g., for focusing the sample to an objective lens of the microscope) can interfere with the positioning of the delivered radiation. In several applications the angle of delivery of the radiation to the sample and/or a sample slide are critical to the results of the microscopy method. When the sample platform is moved with relation to the radiation delivery mechanisms, the delivery mechanisms may require readjustment to ensure the proper delivery of the radiation to the sample. Further, modifying an existing microscope to perform certain specific microscopy methods (e.g., total internal reflection (TIR) microscopy) can be a costly and complex process.

Total internal reflection (TIR) occurs when electromagnetic radiation (EMR), typically light, strikes an interface between two optical media at an incident angle equal to, or greater than the critical angle. FIG. 1 illustrates one example of TIR at an interface 110 between a glass microscope sample slide 120 and a sample 130. The incoming beam of electromagnetic radiation (EMR) 140 is incident at interface 110 at a critical angle 150. TIR energy 160 is reflected, and an evanescent field 170 is thereby produced and emanates into sample 130. The critical angle for TIR at an interface of a first and second material can be given as:

$$\theta_c = \sin^{-1}(n_2/n_1), \text{ where } n_1 > n_2,$$

where $n_1$ is the refractive index of the first material, $n_2$ is the refractive index of the second material, and $\theta_c$ is the critical angle.

SUMMARY OF THE DISCLOSURE

In one embodiment, a launch system for microscopy is provided. The system includes a sample slide having a plurality of sides, each of the plurality of sides having a surface; an optical fiber mounting element positioned in optical contact with at least one of the plurality of sides; and an optical fiber having a first terminal end with a terminal surface, the optical fiber being optically coupled with the optical fiber mounting element so as to position the optical fiber to deliver an EMR from the terminal end through a first surface of the at least one of the plurality of sides into the sample slide to a portion of a second surface of the plurality of sides at a first incident angle.

In another embodiment, a sample slide for microscopy of a sample is provided. The sample slide includes a first side having a first surface; a second side having a second surface; and a fiber insertion portal in the first side, the fiber insertion portal having a fiber insertion axis at a first angle with respect to the second side, the first angle being such that when an optical fiber is inserted within the fiber insertion portal the optical fiber is positioned so to deliver an EMR to the second surface at a second angle.

In yet another embodiment, a microscopy launch system for microscopy of a sample having a first index of refraction is provided. The system includes a sample slide having a plurality of sides, each of the plurality of sides having a surface, the sample slide having a second index of refraction; an optical fiber mounting element positioned in optical contact with at least one of the plurality of sides; and an optical fiber having a first terminal end having a terminal surface, the optical fiber being optically coupled with the optical fiber mounting element so as to position the optical fiber to deliver an EMR from the terminal end through a first surface of the at least one of the plurality of sides into the sample slide to a portion of a second surface of the plurality of sides at a first incident angle, the first incident angle being a function of the first and second indices of refraction.

In still another embodiment, a microscopy launch system for delivering an EMR to a sample slide having a plurality of sides, each of the plurality of sides having a surface is provided. The system includes an optical fiber mounting element configured to be positioned in optical contact with at least one of the plurality of sides; and an optical fiber having a first terminal end having a terminal surface, the optical fiber being optically coupled with the optical fiber mounting element, wherein when the optical fiber mounting element is positioned in optical contact with the sample slide the optical fiber is positioned to deliver an EMR from the terminal end through a first surface of the at least one of the plurality of sides into the sample slide to a portion of a second surface of the plurality of sides at a first incident angle, wherein when a sample is placed proximate the portion the sample is viewable by a microscope at least in part as a result of the EMR.

In still yet another embodiment, a method of performing microscopy. The method includes providing a sample slide having a plurality of sides, each of the plurality of sides having a surface; positioning an optical fiber mounting element in optical contact with a first side of the plurality of sides; providing a sample in contact with a second side of the plurality of sides; and optically coupling a terminal end of an optical fiber with the optical fiber mounting element so as to position the optical fiber to deliver an EMR through the surface of the first side at an interface between the optical fiber mounting element and the sample slide into the sample slide to a portion of the surface of the second side at a desired incident angle.

In a further embodiment, a method of modifying a sample slide for a desired microscopy technique, the sample slide having a first side and a second side, the second side having a surface is provided. The method includes optically coupling an optical fiber mounting element with the first side; optically coupling a terminal end of the optical fiber with the optical fiber mounting element; and positioning the optical fiber in the optical fiber mounting element so as to position the optical fiber to deliver an EMR from a first terminal end of the optical fiber through the first side into the sample slide to the first surface at a desired incident angle.

In yet a further embodiment, a method of modifying a sample slide for TIR microscopy, the sample slide having a first side and a second side, the second side having a first surface, is provided. The method includes positioning an optical fiber at a first position, the optical fiber having a terminal end with a terminal surface, the first position being proximate the first side so as to position the optical fiber to deliver an EMR from the first terminal end to the first surface at a first incident angle, the first incident angle being at least a critical angle for TIR at the second surface.

In still a further embodiment, a method of modifying a microscope for a desired microscopy technique is provided. The method includes providing a sample slide having a first side and a second side, the second side having a first surface; optically coupling an optical fiber mounting element with the first side; optically coupling a terminal end of the optical fiber with the optical fiber mounting element; and positioning the optical fiber at a first position with the optical fiber mounting element so as to position the optical fiber to deliver an EMR from a first terminal end of the optical fiber through the first side into the sample slide to the first surface at a desired incident angle.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A and 4B show one embodiment of an optical fiber mounting element;

FIGS. 5A and 5B show another embodiment of an optical fiber mounting element;

FIGS. 6A and 6B show yet another embodiment of an optical fiber mounting element;

FIGS. 7A and 7B show still another embodiment of an optical fiber mounting element;

DETAILED DESCRIPTION

A system and method is provided that allows the delivery of illumination and/or excitation radiation to a sample. In one embodiment, an optical fiber may be positioned proximate a sample slide such that an electromagnetic radiation (EMR) may be delivered into the sample slide. The EMR that passes into the sample slide illuminates and/or provides an excitation energy to a sample positioned proximate a surface of the sample slide. In one embodiment, a launch system of the present disclosure may be utilized in a variety of microscopy techniques. Example microscopy techniques include, but are not limited to, fluorescence microscopy, TIR microscopy, near-field microscopy, bright field microscopy, darkfield microscopy, surface plasmon microscopy, particle plasmon microscopy, and any combinations thereof.

Figure 2:
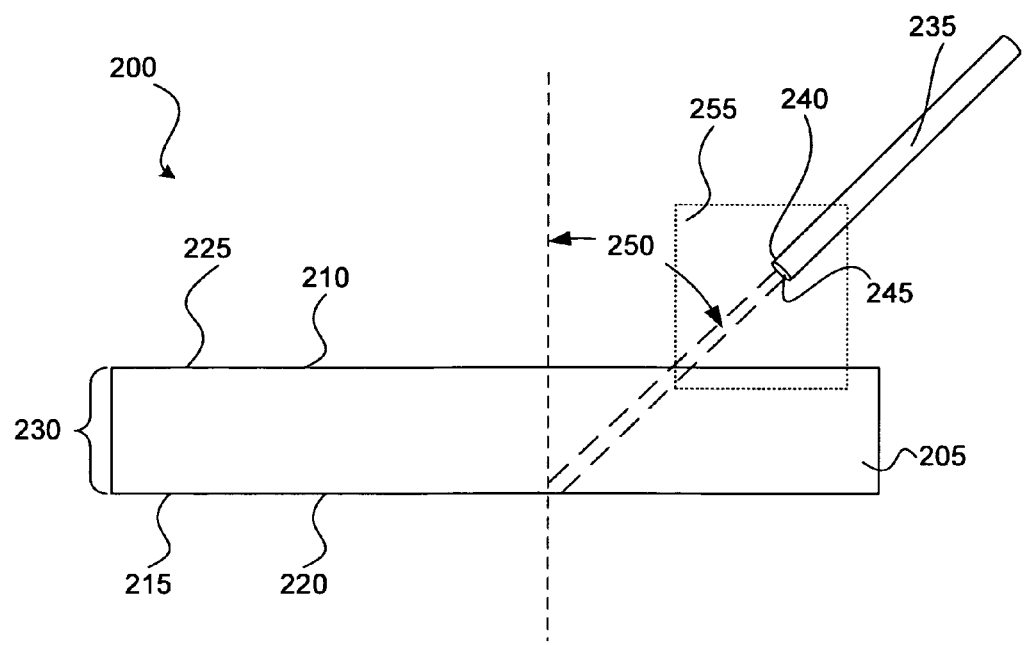
FIG. 2 shows one embodiment of an optical fiber microscopy launch system.

FIG. 2 illustrates one embodiment of an optical fiber microscopy launching system 200. System 200 includes a sample slide 205 having a side 210 and an opposing side 215. Opposing side 215 has a surface 220. Side 210 has a surface 225. Sample slide 205 has a width 230. An optical fiber 235, which includes a terminal end 240 having a terminal surface 245, is positioned proximate side 210 so as to locate terminal end 240 to deliver EMR from optical fiber 235 into the substrate 205 to a portion of side 215 at an incident angle 250. In one example, incident angle 250 may depend on the location of a sample on sample slide 205, the desired microscopy technique, and/or the desired incident angle to the sample. In an example of TIR microscopy, incident angle 250 is at least equal to or greater than the critical angle for TIR at surface

220. The delivery of EMR may be facilitated in any way that will allow the EMR to enter substrate 210 such that it is delivered to surface 220 at incident angle 250. Structure in substrate 205 or in addition to substrate 205 for this facilitation may take place in any location, such as location 255. In this example, side 210 and opposing side 215 are substantially parallel to each other. In another example, illustrated in more detail below, an optical fiber is positioned proximate a side that is at an acute angle, such as an about 90 degree angle, to an opposing side.

A sample slide, such as sample slide 205, may include any of a variety of optically transmissive material. Examples of suitable sample slide materials include, but are not limited to, glass, fused silica, sapphire, plastic, zirconia, germanium, diamond, and any combinations thereof. A sample slide may include a material having any index of refraction that will allow delivery of EMR from an optical fiber into a sample slide and to a region proximate a sample positioned on or near the sample slide. In one example, a sample slide includes a silica glass, with an index of refraction of about 1.40. In another example, a sample slide includes a material having an index of refraction higher than that of its surroundings (e.g., for allowing TIR to occur at an interface of the substrate and the surrounding). In yet another example, a sample slide may be made of a material having any index of refraction that will allow TIR at its surface interface with desired samples and desired external media.

The thickness of a sample slide can vary depending on application. In one example, a sample slide has a thickness of about 0.125 millimeters (mm) to about 1.0 mm. In another example, a sample slide has two planar sides opposite each other that are large enough to accommodate a desired sample, each planar side being larger in surface area than a side that connects the two planar sides. The two planar sides in this example can be of any shape, including (but not limited to), square, rectangular, circular, oval, octagonal, triangular, and trapezoidal. In yet another example, a sample slide is a microscope slide.

An optical fiber, such as optical fiber 235, may be an optical EMR waveguide. Examples of suitable optical fiber materials include, but are not limited to, single mode, multi mode, polarization maintaining, and any combination thereof. In one example, an optical fiber may be shielded and/or coated as is understood by those of ordinary skill in the art. An optical fiber may be fabricated with a cladding to enhance performance and to isolate the TIR within the fiber from environmental coupling effects to the outside surface. Other coatings or armor are sometimes added for mechanical stability. In one example, an optical aperture at a terminal end (e.g., terminal end 240, can be very small with respect to the fiber. For example, a single mode fiber may have a diameter of about 125 microns, while its optical aperture is at about 6 microns. In another example, an optical fiber can have an optical element at its terminal end, such as at terminal end 240. Examples of optical elements that may be present at a terminal end of an optical fiber include, but are not limited to, a lens, index matching medium such as oil or optical epoxy, optical grating, prism and any combinations thereof. In one example, a lens is positioned in optical communication with a terminal end of an optical fiber to focus EMR transmitted therefrom. In this disclosure, discussion of a terminal end of an optical fiber includes the option of one or more optical elements at that terminal end.

A "proximate position" for an optical fiber with respect to a side of a sample slide in the context of the present disclosure is a position that is close enough to provide EMR from the optical fiber first impinging on that side and transmitting to the surface of an opposing side of the sample slide at a desired incident angle (e.g., incident angle 250). In one example, a proximate position is one that will provide EMR to a surface of an opposing side of a sample slide at an angle that will produce TIR at the surface of the opposing side. The distance from the terminal end of the optical fiber to the sample slide may depend on factors that include, but are not limited to, the numerical aperture of the optical fiber, the index of refraction of the sample slide, the thickness of the sample slide, the angle of the first side of the sample slide relative to the second side of the sample slide, the index of refraction of any material between the terminal end of the optical fiber and the sample slide, and any combinations thereof.

The type of EMR delivered via an optical fiber will depend on the desired microscopy application the type of sample, and/or the slide material. In one example, a suitable EMR for TIR microscopy may be any EMR that can be delivered using an optical fiber and will cause the excitation of fluorophores desired to be viewed during any particular TIR microscopy. One of ordinary skill will recognize the variety of EMR suitable for use with TIR microscopy. Examples of EMR suitable for microscopy include, but are not limited to, collimated light, non-collimated light, laser light, polarized and non-polarized light, arc lamp light, filament lamp light, flash lamp light, and any combinations thereof. In one example, a collimated light source is employed. In another example, a non-collimated light source is employed. In yet another example, EMR may emit from a terminal end of an optical fiber at more than one angle. In this example, the optical fiber is positioned so that EMR that is directed to an opposing surface at the most extreme angle is at the desired incident angle (e.g., at least a critical angle for TIR) so that all of the angled light is at least at the desired angle. One benefit of the present disclosure is that an optical fiber according to the present disclosure can deliver non-collimated EMR to a sample slide while retaining an illumination area of defined geometry that can be easily adjusted to accommodate experimental variations. Previous system, such as in TIR microscopy systems, used collimated EMR, usually a laser, due to the need to direct the EMR to an objective lens or prism using the various optical equipment discussed above, such as beam expanders, mirrors, and focusing lenses.

In one example wherein the material between a terminal end of an optical fiber and a side of a sample slide (e.g., having an index of refraction of about 1.5) is air (index of refraction of about 1) or water (index of refraction of about 1.33), the sample slide may require a modification to the side upon which EMR from the terminal end of the optical fiber first impinges in order to allow a portion of the EMR to be transmitted to a surface of an opposing side of the sample slide. Examples of such modifications are discussed below and include, but are not limited to, providing a bevel in the side of the sample slide, the bevel having a surface that is at an angle with respect to the terminal end of an optical fiber to allow transmission of EMR into the sample slide; providing a micrograting, a prism, a mounting element, a coupling medium, a fresnel lens; and any combinations thereof.

An optical fiber can be held in position relative to a side of a sample slide in any way that will maintain the desired angle of incidence of the EMR at a surface of an opposing side. In one example, a mounting element, as discussed below, is used to hold an optical fiber in position. In yet another example, an optical fiber is positioned in a fiber insertion portal, discussed below, that is in the sample slide or an additional mounting element.

Figure 3:
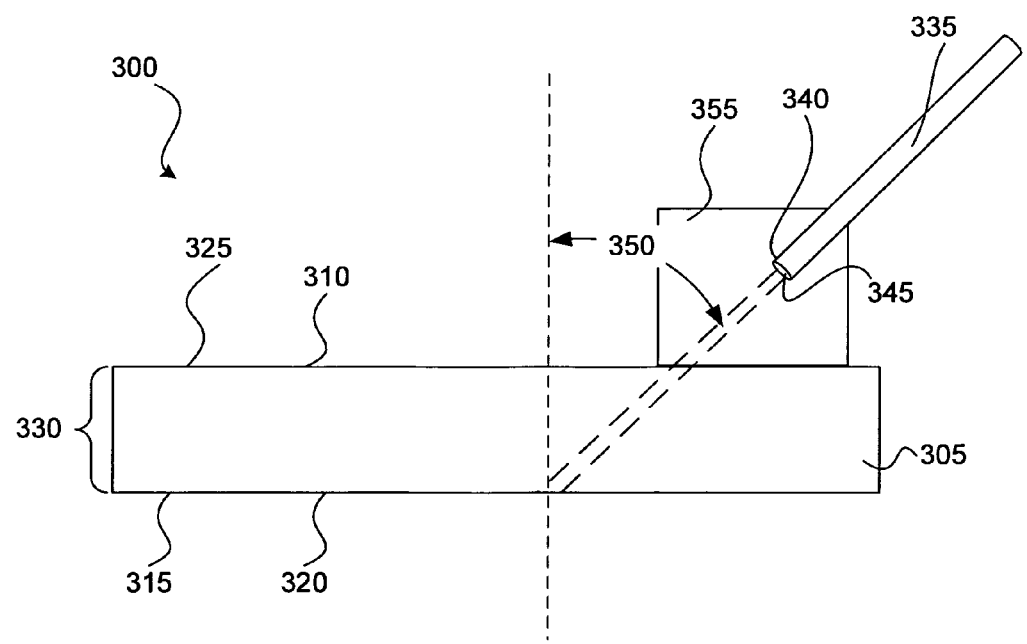
FIG. 3 shows another embodiment of an optical fiber microscopy system.

In one embodiment, the facilitation of the delivery of EMR into a sample slide, such as sample slide 205, may include an optical fiber mounting element as part of the sample slide and/or optically coupled thereto. FIG. 3 illustrates one example of a sample slide 305 having a first side 310 and a second side 315. Second side 315 has a surface 320. An optical fiber 335 is positioned proximate first side 310 utilizing an optical fiber mounting element 355 optically coupled to first side 310 of sample slide 305.

An optical fiber mounting element may be configured in a way and/or may include any material that will allow EMR to pass from a terminal end of an optical fiber (e.g., terminal end 340 of optical fiber 335) to a sample slide, while positioning the optical fiber to deliver EMR to a surface of a second side (e.g. side 315) of the sample slide at a desired angle of incidence, such as angle 350. Example mounting element materials include, but are not limited to, prism, glass, plastic, sapphire, metal, an optical coupling medium, and any combinations thereof. An optical coupling medium may be any material that facilitates transmission of EMR from one material to another (e.g., from an optical fiber mounting element to a sample slide, from an optical fiber to an optical fiber mounting element. Examples of an optical coupling medium include, but are not limited to, water, an optical adhesive, glycerol, an optical oil, an optical grating (e.g., a micrograting), a prism, a beveled window, a lens, and any combination thereof. In one example, an optical coupling medium may be utilized to bring optical fiber 335 into optical communication with optical fiber mounting element 355. In another example, a coupling medium may be utilized to connect optical fiber mounting element 355 in optical communication with sample slide 305.

An optical fiber mounting element may have a substantially similar index of refraction as a sample slide or a different index of refraction as a sample slide as long as an optical fiber is positioned so to deliver EMR at a desired angle of incidence. In one example, the index of refraction of an optical fiber mounting element is the same, or substantially the same, as a sample slide. In such an example, EMR from the terminal end of an optical fiber in optical communication with an optical fiber mounting element will enter the optical fiber mounting element at a first angle. Since the index of refraction of the optical fiber mounting element, which is in optical communication with the sample slide, is the same as the index of refraction of the sample slide, the EMR does not refract, or refracts only minimally, at the interface between the optical fiber mounting element and the sample slide. In another example, an optical fiber mounting element has an index of refraction that differs from the index of refraction of a sample slide to which it is in optical communication. In such an example, EMR from the terminal end of an optical fiber in optical communication with the optical fiber mounting element will enter the optical fiber mounting element at a first angle. Since the index of refraction of the optical fiber mounting element is different than the index of refraction of the sample slide, the EMR refracts at the interface of the optical fiber mounting element and the sample slide. Thus, the angle of incidence at an opposing surface of the sample slide is different than the first angle. One advantage to such an example is that an optical fiber can be positioned with respect to a sample slide at an angle that would not otherwise provide light to the internal surface of the second side of a sample slide at a desired angle of incidence (e.g., a critical angle for TIR). Due to the refraction at the interface between the optical fiber mounting element and the sample slide, a critical angle can be attained nonetheless. This can be useful when microscope equipment or other impediments make it difficult to position the optical fiber itself at an angle that would otherwise provide EMR at the desired angle of incidence at the opposing surface.

An optical fiber mounting element, such as optical fiber mounting element 355 can be any shape suitable for properly positioning an optical fiber with respect to a sample slide. Example shapes of an optical fiber mounting element include, but are not limited to, round, triangular, square, rectangle, hemisphere, trapezoid, and parallelogram. In one example, an optical fiber mounting element may include a fiber insertion portal. In another example, an optical fiber mounting element may be a fiber insertion portal directly in a side of a sample slide. In one example, optical fiber mounting element 355 is configured such that at least some of the EMR passing into the sample slide and to the opposing side has an angle of incidence that is at or above a critical angle for TIR to occur at the surface of the opposing side. In another example, optical fiber mounting element 355 is configured such that at least some of the EMR passing into the sample slide and to the opposing side has an angle of incidence that is below a critical angle for TIR and passes through the opposing side to a sample positioned proximate the opposing side and/or to a region surrounding the sample slide.

In one example, an optical fiber mounting element may be of an optically opaque material which holds, contains, or locates an optical coupling medium. In another example, an optical fiber mounting element may contain reflective or refractive optics or optical properties. An optical fiber mounting element may be a monolithic material with a sample slide. In another example, an optical fiber mounting element may be a separate material (with similar or different index of refraction) that is, or can be, positioned in optical communication with a side of a sample slide. In another example, an optical fiber mounting element is a separate material which is optically opaque, and provides a portal for fiber insertion into an optical coupling medium which facilitates EMR transmission into the sample slide through a window or optical portal. In still another example, an optical fiber mounting element may include refractive elements such as a lens to bend the light rays prior to transmission into the sample slide. In another example, an optical fiber mounting element simply holds the fiber at a suitable angle proximate to a grating or beveled edge where the EMR enters the sample slide.

An optical fiber mounting element may be configured to allow an optical fiber to move from one position to another to allow for adjustment in the angle of incidence at an opposing side. Such movement may allow microscopy with one technique (e.g., TIR) and ease of movement to an additional technique (e.g., darkfield).

FIG. 4A illustrates a cross-sectional view of one example of an optical fiber mounting element 455. Optical fiber mounting element 455 includes a fiber insertion portal 460 having a fiber insertion axis 462. Although fiber insertion portal 460 is shown in FIG. 4A as being in a top side of an optical fiber mounting element, it is contemplated that a fiber insertion portal can be in another side of an optical fiber mounting element. Fiber insertion portal 460 is an appropriate size and shape to receive an optical fiber. In one example, a fiber insertion portal, such as fiber insertion portal 460, is conformally configured to receive an optical fiber. In another example, any space in fiber insertion portal 460 that would remain after insertion of an optical fiber can be filled with an optical coupling medium. Fiber insertion portal 460 includes an end 464, a side 466, and a side 468. End 464 can be of any shape and at any angle to sides 466 and 468. In one example, end 464 is configured at such an angle with respect to EMR from an optical fiber inserted therein so to allow transmission of at least a portion of the EMR into the optical fiber mounting element, for example such an angle that is about normal to the EMR. End 464 is shown as being at a right angle to sides 466 and 468. In one example, end 464 is at an angle to sides 466 and 468 so to conformally receive an optical fiber having an angled terminal end. In another example (not shown), end 464 is shaped to conformally receive an optical fiber having a terminal end including an optical element (e.g., a lens, prism, grating). One of ordinary skill will recognize a many variety of combinations of shapes of a fiber insertion portal and an optical fiber that are available, including with an option of filling extra space with a coupling medium.

Optical fiber mounting element 455 has a contact side 470 for contacting with a side of a sample slide. FIG. 4B shows a plan view of optical fiber mounting element 455 with fiber insertion portal 460. Optical fiber mounting element 455 is shown as a rectangular block. As discussed above, an optical fiber optical fiber mounting element can be any shape suitable for properly positioning an optical fiber with respect to a sample slide. Optical fiber mounting element 455 shows one fiber insertion portal 460. It is contemplated that a plurality of fiber insertion portals may be provided in one optical fiber mounting element. This may facilitate multiple fiber excitation and/or illumination as is discussed further below.

FIG. 5A illustrates a cross-sectional view of one example of an optical fiber mounting element 555. Optical fiber mounting element 555 includes a fiber insertion portal 560 having a fiber insertion axis 562. Fiber insertion portal 560 is an appropriate size and shape to receive an optical fiber. Fiber insertion portal 560 includes an end 564, a side 566, and a side 568. End 564 is open at a contact side 570. Contact side 570 is configured to contact with a side of a sample slide. In one example, a terminal end of an optical fiber inserted in fiber insertion portal 560 may extend to end 564. An optical coupling medium (e.g., an oil) may be utilized in fiber insertion portal 560 to provide optical coupling between the terminal end and a sample slide proximate to surface 570. Optical fiber mounting element 555 may be constructed from a variety of materials. In one example optical fiber mounting element 555 may be constructed of an optically opaque material. FIG. 5B illustrates a plan view of optical fiber mounting element 555 including fiber insertion portal 560.

A fiber insertion portal can be at any appropriate depth for properly positioning an optical fiber. When an optical fiber mounting element is used in conjunction with a mechanical coupling or other coupling, the depth of a fiber insertion portal may not be required to support an optical fiber itself. FIG. 6A illustrates a cross-sectional view of an example of an optical fiber mounting element 655 having a fiber insertion portal 660. Fiber insertion portal 660 is shaped as a bevel in a side 674 of optical fiber mounting element 655. FIG. 6B illustrates a plan view of optical fiber mounting element 655 and fiber insertion portal 660. Fiber insertion portal 660 is shown here as a bevel across the surface of side 674.

FIG. 7A illustrates a cross-sectional view of an example of an optical fiber mounting element 755 having a grating 760 in side 774. FIG. 7B illustrates a plan view of optical fiber mounting element 755 and grating 760. As one of ordinary skill will recognize, a beveled fiber insertion portal or a grating in the surface need not extend the entire surface of side. Further, in another example, a beveled fiber insertion portal or a grating may be made directly in a side of a substrate.

Some variations of the fiber insertion portal provide optical coupling facility only. In FIG. 6 and FIG. 7, EMR is transmitted into the element because of the angle of the bevel or grating. These examples may require additional mechanical facility for holding the optical fiber such that EMR is directed from a terminal end of the optical fiber to fiber insertion portal 660, grating 760 such that the EMR will enter the optical fiber mounting element and transmit into a sample slide proximate to a surface of the optical fiber mounting element.

In another embodiment, not shown, an optical fiber mounting element, such as optical fiber mounting element 455, can have an optical fiber inserted in its fiber insertion portal. The optical fiber may in some cases be made to be in optical communication with the optical fiber mounting element with the use of an optical coupling medium or some other technique. In one example, the optical fiber can be attached to the optical fiber mounting element using an optical adhesive as the optical coupling medium or some other form of adhering technique. In another example, the end of the optical fiber not coupled with the optical fiber mounting element can be terminated with any optical coupling known to those of ordinary skill and/or may be connected to a source of EMR. In still another example, a system of the present disclosure can be used to modify a sample slide, as discussed further below.

Figure 8:
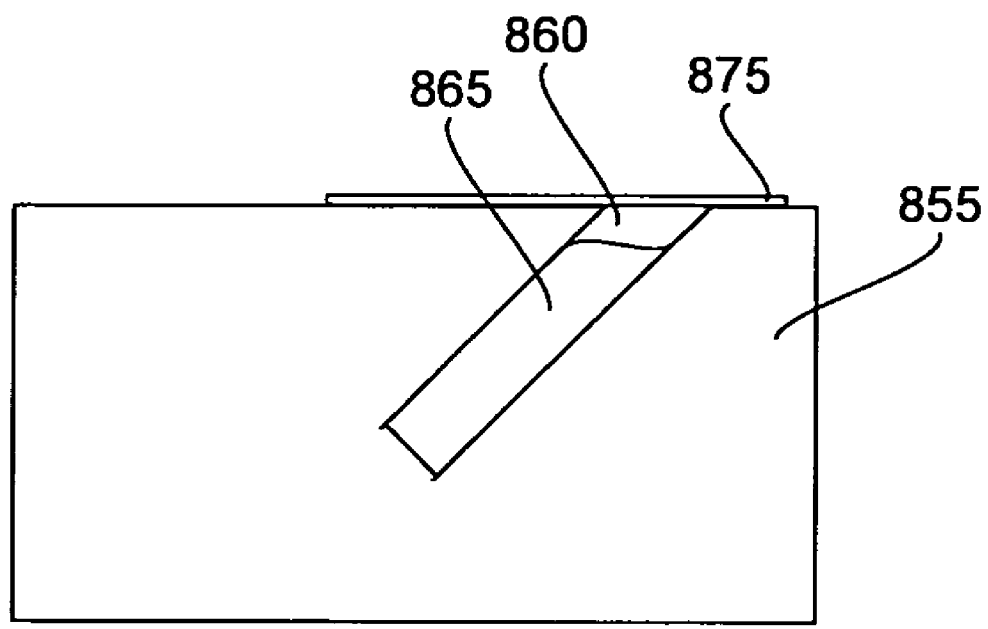
FIG. 8 shows a further embodiment of an optical fiber mounting element.

FIG. 8 illustrates yet another embodiment of an optical fiber mounting element 805. Optical fiber mounting element 805 can have a fiber insertion portal 860 that is filled with an optical coupling medium 865, such as an optical adhesive, glycerol, an optical oil, and/or other coupling medium. In one example, the opening of the fiber insertion portal can be sealed with an appropriate sealing element 875. Examples of an appropriate sealing element include, but are not limited to, an adhesive tape, a plug, silicone rubber, thermoplastic, epoxy resin, clay, putty, and any combinations thereof. Prior to use of optical fiber mounting element 855, sealing element 875 may be removed and an optical fiber inserted into fiber insertion portal 860. Such an optical fiber mounting element may be provided alone or pre-attached/optically coupled to a sample slide.

Figure 9:
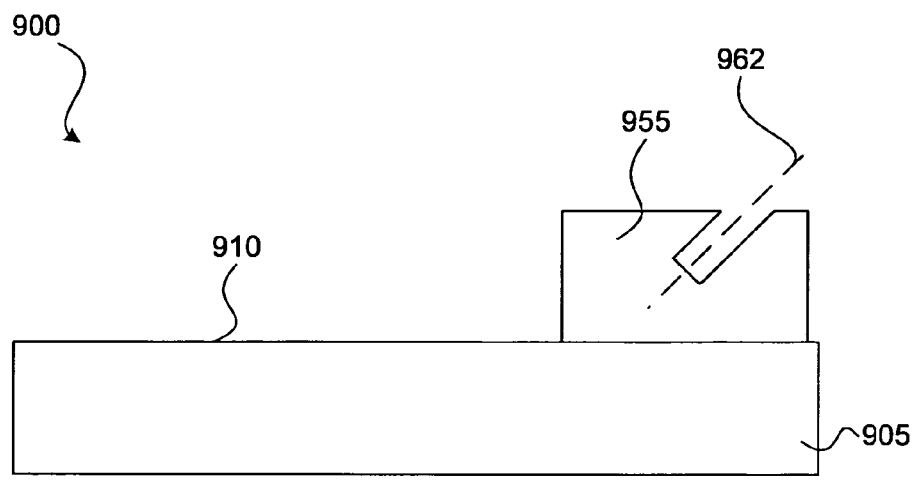
FIG. 9 shows one example of an optical fiber microscopy launch system having an example of a fiber insertion portal.

FIG. 9 illustrates an example of a sample slide 905 having a side 910 in optical communication with optical fiber mounting element 955. Optical fiber mounting element 955 includes a fiber insertion portal 960 having a fiber insertion axis 962. Optical communication can be facilitated using an optical coupling medium, such as an optical adhesive, glycerol, an optical oil, and/or other coupling medium.

Figure 10:
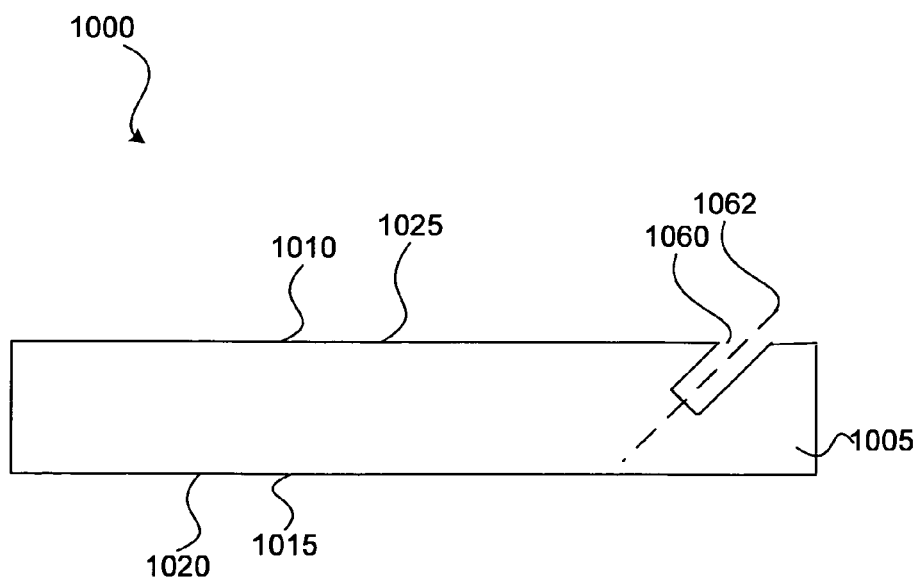
FIG. 10 shows another example of an optical fiber microscopy launch system having an example of a fiber insertion portal.

FIG. 10 illustrates yet another embodiment of a sample slide 1005 having a side 1010 with a surface 1025, and a side 1015 with a surface 1020. Sample slide 1110 includes a optical fiber mounting element that is a fiber insertion portal 1060 having a fiber insertion axis 1062.

In another example, not shown, a sample slide, such as sample slide 1005, can have an optical fiber inserted in fiber insertion portal 1060. The optical fiber may in some cases be made to be in optical communication with the sample slide with the use of an optical coupling medium or some other technique. The optical fiber can be attached to the sample slide using an optical adhesive as an optical coupling medium or some other form of adhering technique. In one example, the end of the optical fiber not coupled with the sample slide can be terminated with any optical coupling known to those of ordinary skill or may be connected directly to a source of EMR.

In yet another example, not shown, a sample slide may have a fiber insertion portal filled with an optical coupling medium with a sealing element, as was discussed above with respect to a fiber insertion portal of an optical fiber optical fiber mounting element above.

As was discussed above, an optical fiber microscopy launch system and/or method of the present disclosure may be utilized in a variety of microscopy application.

Figure 11:
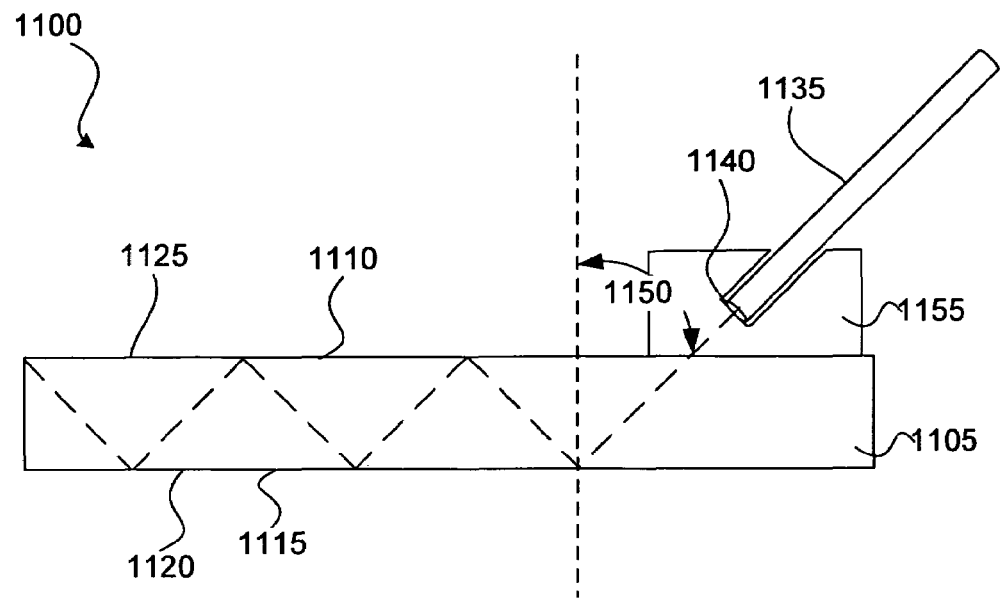
FIG. 11 shows one example of an optical fiber microscopy launch system configured to deliver EMR at an incident angle that is at or above a critical angle for TIR.

FIG. 11 illustrates one example optical fiber microscopy launch system 1100. System 1100 includes a sample slide 1105 having a first side 1110 and a second opposing side 1115. Second side 1115 has a surface 1120 and first side 1110 has a surface 1125. Optical fiber 1135 has a terminal end 1140 that is in proximity to first side 1110. Optical fiber 1135 is optically coupled with an optical fiber mounting element 1155 that is optically coupled to surface 1125. Optical fiber 1135 is positioned by optical fiber mounting element 1155 such that EMR from terminal end 1140 is directed through an interface between optical fiber mounting element 1155 and sample slide 1105 to surface 1120 at an incident angle 1150 that is at least a critical angle for TIR. The EMR totally internally reflects at surface 1120 and continues TIR through sample slide 1105. TIR fluorescent microscopy (TIRFM) may be implemented by observing fluorescence of a sample on a surface of sample slide 1105 at a point of TIR.

Terminal end 140 of optical fiber 1135 is shown as being in conformal contact with respect to a surface of optical fiber mounting element 1155. In an alternative embodiment, a terminal end of an optical fiber, such as terminal end 140, may be in contact with a surface of an optical fiber mounting element, such as optical fiber mounting element 1155, such that it does not conform and provides a refraction of EMR as it passes from the terminal end into an optical fiber mounting element 1155. In one example, terminal end 140 may be configured at an angle with respect to optical fiber 1135 (i.e., at a non-normal angle). In another example, a lens or other refracting material may be utilized between a terminal end of an optical fiber and an optical fiber mounting element. In yet another example, one or more bevels in the surface of an optical fiber mounting element may provide a desired refraction. In still another example, a coupling medium with a mismatched index of refraction may be provided between a terminal end and an optical fiber mounting element to provide a desired refraction of EMR. One benefit that may be provided by refracting an EMR as it passes from a terminal end of an optical fiber (e.g., terminal end 1140) to an optical fiber mounting element (e.g., optical fiber mounting element 1155) includes the ability to provide flexibility in an incident angle (e.g., incident angle 1150).

Optical fiber 1135 is shown for convenience of illustration in FIG. 11 as having space between optical fiber 1135 and the walls of a fiber insertion portal of optical fiber mounting element 1155. An optical fiber, such as optical fiber 1135, may be positioned in a fiber insertion portal of an optical fiber mounting element such that there is substantially no space between the side of the optical fiber and the optical fiber mounting element.

Figure 12:
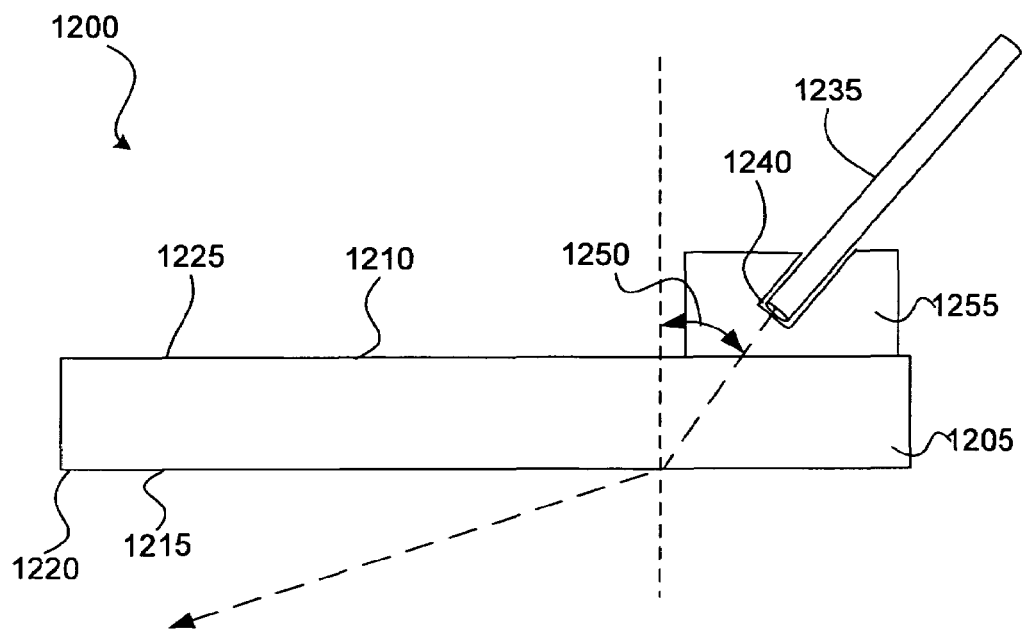
FIG. 12 shows one example of an optical fiber microscopy launch system configured to deliver EMR at an incident angle that is less than a critical angle for TIR.

FIG. 12 illustrates another example optical fiber microscopy launch system 1200. System 1200 includes a sample slide 1205 having a first side 1210 and a second opposing side 1215. Second side 1215 has a surface 1220 and first side 1210 has a surface 1225. Optical fiber 1235 has a terminal end 1240 that is in proximity to first side 1210. Optical fiber 1235 is optically coupled with an optical fiber mounting element 1255 that is optically coupled to surface 1225. Optical fiber 1235 is positioned by optical fiber mounting element 1255 such that EMR from terminal end 1240 is directed through an interface between optical fiber mounting element 1255 and sample slide 1205 to surface 1220 at an incident angle 1250 that is less than a critical angle for TIR. The EMR totally transmits through surface 1220 and refracts.

Figure 13:
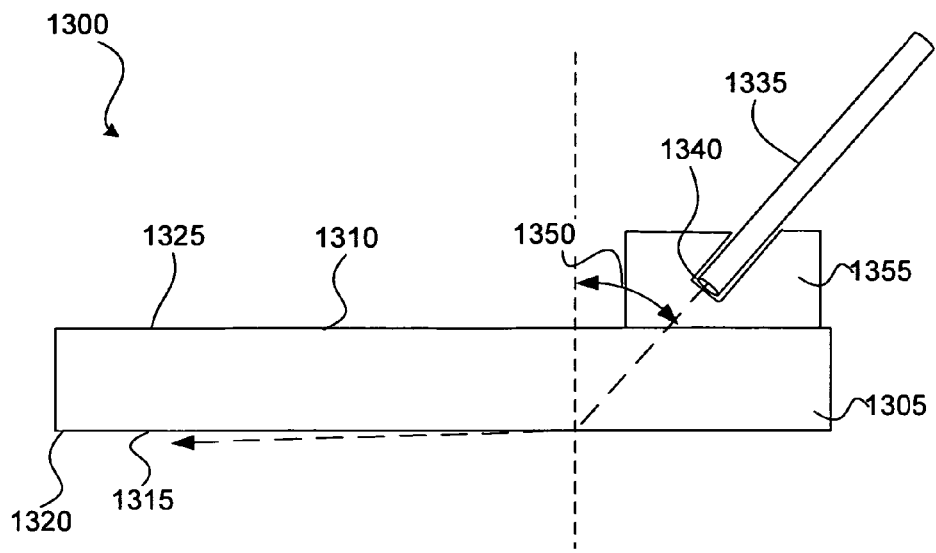
FIG. 13 shows another example of an optical fiber microscopy launch system configured to deliver EMR at an incident angle that is less than a critical angle for TIR.

FIG. 13 illustrates yet another example optical fiber microscopy launch system 1300. System 1300 includes a sample slide 1305 having a first side 1310 and a second opposing side 1315. Second side 1315 has a surface 1320 and first side 1310 has a surface 1325. Optical fiber 1335 has a terminal end 1340 that is in proximity to first side 1310. Optical fiber 1335 is optically coupled with an optical fiber mounting element 1355 that is optically coupled to surface 1325. Optical fiber 1335 is positioned by optical fiber mounting element 1355 such that EMR from terminal end 1340 is directed through an interface between optical fiber mounting element 1355 and sample slide 1305 to surface 1320 at an incident angle 1350 that is just barely less than a critical angle for TIR. The EMR totally transmits through surface 1320 and refracts nearly perpendicular to surface 1320.

Figure 14:
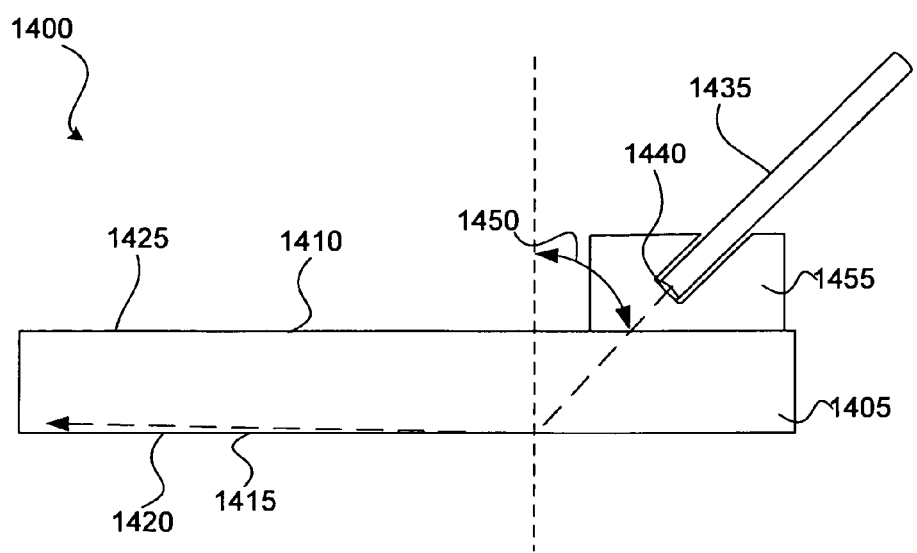
FIG. 14 shows another example of an optical fiber microscopy launch system configured to deliver EMR at an incident angle that is at or above a critical angle for TIR.

FIG. 14 illustrates still another example optical fiber microscopy launch system 1400. System 1400 includes a sample slide 1405 having a first side 1410 and a second opposing side 1415. Second side 1415 has a surface 1420 and first side 1410 has a surface 1425. Optical fiber 1435 has a terminal end 1440 that is in proximity to first side 1410. Optical fiber 1435 is optically coupled with an optical fiber mounting element 1455 that is optically coupled to surface 1425. Optical fiber 1435 is positioned by optical fiber mounting element 1455 such that EMR from terminal end 1440 is directed through an interface between optical fiber mounting element 1455 and sample slide 1405 to surface 1420 at an incident angle 1450 that is just barely greater than a critical angle for TIR. The EMR totally internally reflects at surface 1420 at a low angle and transmits through sample slide 1405. In this example, a sample for TIRFM would need to be positioned at the single point of TIR on surface 1420.

Figure 15:
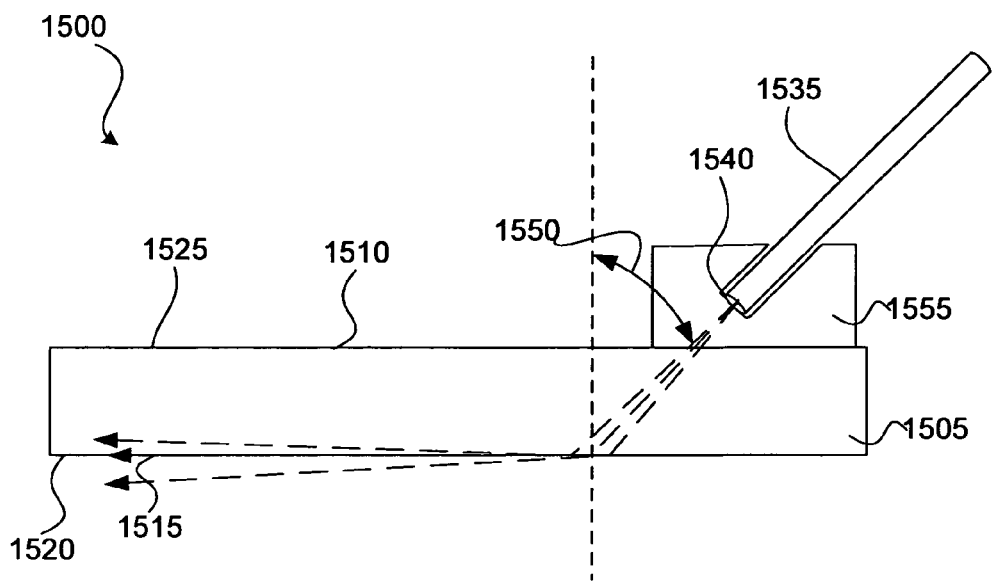
FIG. 15 shows one example of an optical fiber microscopy launch system configured to deliver EMR at an incident angle that is at or above a critical angle for TIR and at an incident angle that is less than a critical angle for TIR.

In practice, total collimation of EMR emerging from a terminal end of an optical fiber is not always achieved and/or desired. In one example, divergent EMR may provide a narrow band of angles of EMR with some of the EMR directed to an opposing surface at or above a critical angle for TIR and some of the EMR directed to an opposing surface at an angle less than a critical angle for TIR. FIG. 15 illustrates a further example optical fiber microscopy launch system 1500. System 1500 includes a sample slide 1505 having a first side 1510 and a second opposing side 1515. Second side 1515 has a surface 1520 and first side 1510 has a surface 1525. Optical fiber 1535 has a terminal end 1540 that is in proximity to first side 1510. Optical fiber 1535 is optically coupled with an optical fiber mounting element 1555 that is optically coupled to surface 1525. Optical fiber 1535 is positioned by optical fiber mounting element 1555 such that EMR from terminal end 1540 is directed through an interface between optical fiber mounting element 1555 and sample slide 1505 to surface 1520 at an various incident angles 1550, some of which are just barely at or greater than a critical angle for TIR and others that are just barely below a critical angle for TIR. Some of the EMR totally transmits at a low angle to surface 1520 and some of the EMR totally internally reflects at a low angle to surface 1520. Some EMR is traveling substantially parallel to surface 1520.

In one example, an optical fiber may be positioned utilizing an optical fiber mounting element such that its position may be varied in order to take advantage of the differing reflection and transmission characteristics at different incident angles. In one example, an EMR that transmits through an opposing surface (e.g., surface 1520) and propagates nearly parallel to that surface may provide illumination of a sample on that surface. In another example, an EMR that totally internally reflects may provide an evanescent field, as discussed further below, that is used as an excitation energy for TIRFM. In yet another example, a combination of illumination and excitation may also be provided.

Figure 16:
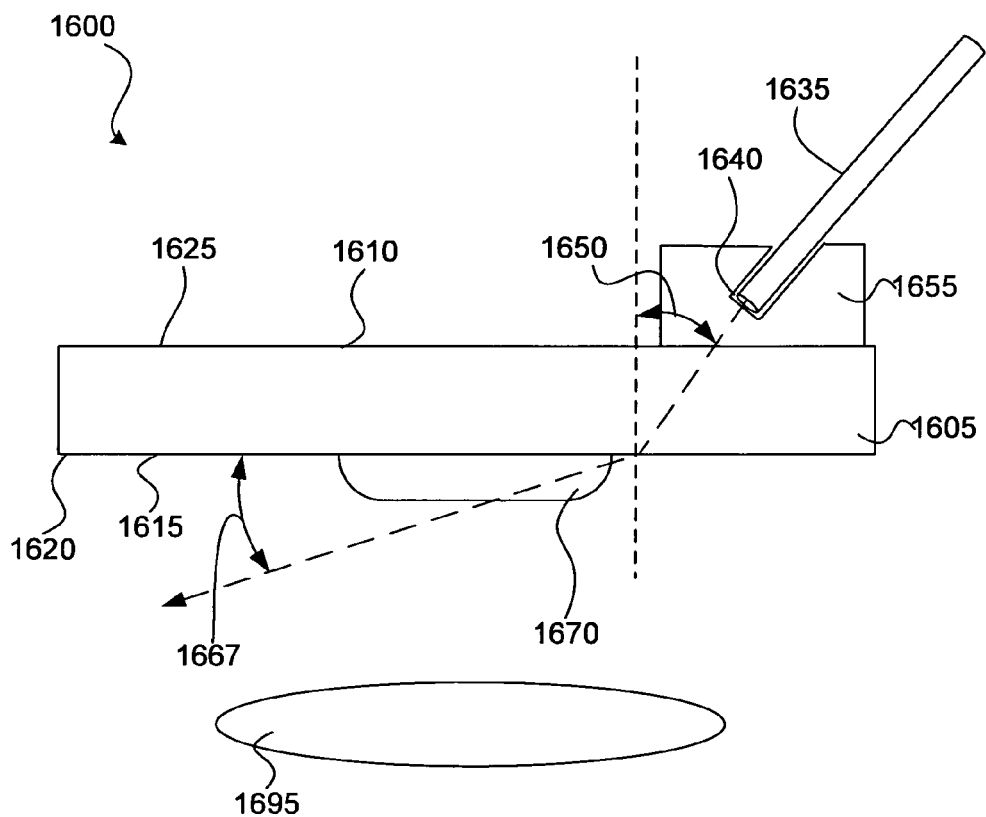
FIG. 16 shows one example of an optical fiber microscopy launch system configured for an example darkfield application.

FIG. 16 illustrates one example darkfield microscopy application 1600 utilizing an incident angle of less than a critical angle for TIR. Application 1600 includes a sample slide 1605 having a first side 1610 and a second opposing side 1615. Second side 1615 has a surface 1620 and first side 1610 has a surface 1625. Optical fiber 1635 has a terminal end 1640 that is in proximity to first side 1610. Optical fiber 1635 is optically coupled with an optical fiber mounting element 1655 that is optically coupled to surface 1625. Optical fiber 1635 is positioned by optical fiber mounting element 1655 such that EMR from terminal end 1640 is directed through an interface between optical fiber mounting element 1655 and sample slide 1605 to surface 1620 at an incident angle 1650 that is less than a critical angle for TIR. The EMR totally transmits through surface 1620 and refracts at an angle 1667. A sample 1670 is positioned at surface 1620 such that it is illuminated by the refracted EMR. The EMR continues at about angle 1667 such that it does not enter an objective lens 1695. Such an example may be useful for darkfield microscopy application. In one example, sample slide 1605 may be positioned with respect to objective lens 1695 so that objective lens 1695 may detect scattered and/or fluorescent energy (e.g., light) from sample 1670 as the EMR illuminates sample 1670.

Figure 17:
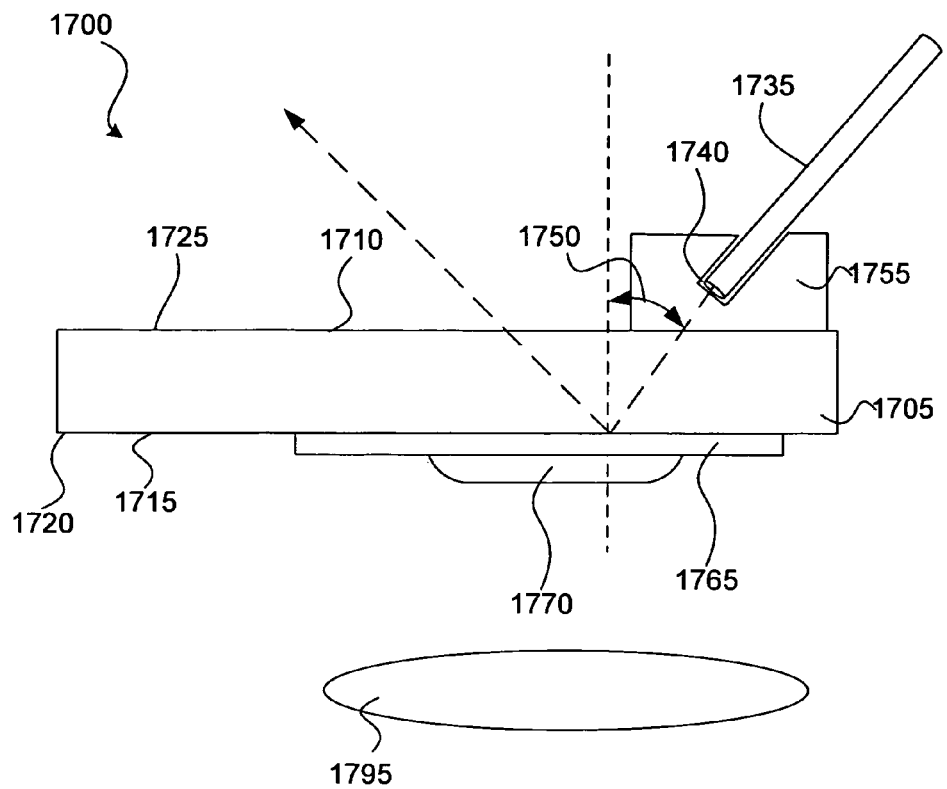
FIG. 17 shows one example of an optical fiber microscopy launch system configured for an example surface plasmon application.

FIG. 17 illustrates one example surface plasmon microscopy application 1700. Application 1700 includes a sample slide 1705 having a first side 1710 and a second opposing side 1715. Second side 1715 has a surface 1720 and first side 1710 has a surface 1725. Optical fiber 1735 has a terminal end 1740 that is in proximity to first side 1710. Optical fiber 1735 is optically coupled with an optical fiber mounting element 1755 that is optically coupled to surface 1725. Optical fiber 1735 is positioned by optical fiber mounting element 1755 such that EMR from terminal end 1740 is directed through an interface between optical fiber mounting element 1755 and sample slide 1705 to surface 1720 at an incident angle 1750. In one example, incident angle 1750 may be as low as zero degree (i.e., perpendicular to surface 1725). A surface plasmon reflective layer 1765 is positioned at the point of incidence of the EMR and a sample 1770 is positioned in contact with surface plasmon reflective layer 1765 opposite of sample slide 1705. Example surface plasmon reflective layers include, but are not limited to, a thin film of a material such as gold, a silver, copper, aluminium, sodium, indium, and any combinations thereof. When incident angle 1750 allows transmission of the EMR through surface 1720, the EMR reflects from layer 1765, which induces an evanescent field-like non-radiative transfer of energy to sample molecules in close proximity to layer 1765. Such an example may be useful for fluorescence microscopy, measurement of a density change in sample 1770, measurement of a surface binding energy, fluorescence-based immunoassays, and any combinations thereof. In another example, a surface plasmon may be applied to multiple surfaces of a sample slide. In one aspect application 1700 may provide a simplified process and equipment for conducting a surface plasmon technique. In one example, an objective lens 1795 (or other detection element) may be positioned to view and/or detect an energy from sample 1770.

Figure 18:
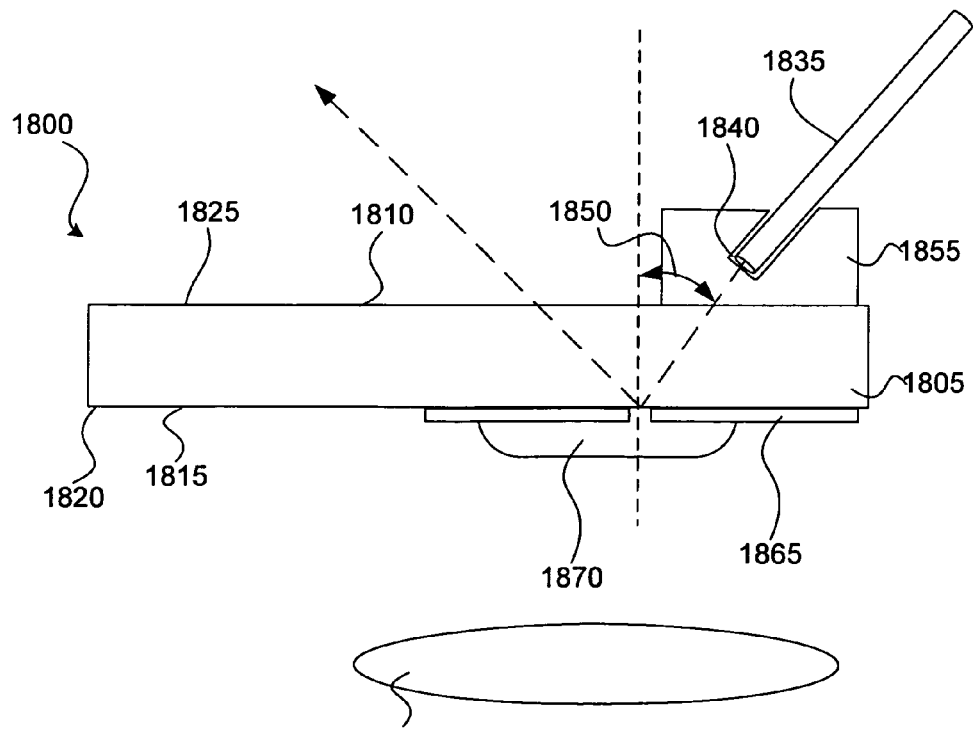
FIG. 18 shows one example of an optical fiber microscopy launch system configured for an example near-field application.

FIG. 18 illustrates one example of a near-field microscopy application 1800. Application 1800 includes a sample slide 1805 having a first side 1810 and a second opposing side 1815. Second side 1815 has a surface 1820 and first side 1810 has a surface 1825. Optical fiber 1835 has a terminal end 1840 that is in proximity to first side 1810. Optical fiber 1835 is optically coupled with an optical fiber mounting element 1855 that is optically coupled to surface 1825. Optical fiber 1835 is positioned by optical fiber mounting element 1855 such that EMR from terminal end 1840 is directed through an interface between optical fiber mounting element 1855 and sample slide 1805 to surface 1820 at an incident angle 1850. In one example, incident angle 1850 may be as low as zero degree (i.e., perpendicular to surface 1825). A coating 1865 or other element that provides reflection for the EMR and one or more holes and/or slits 1867 in the coating that have a width that is smaller than the wavelength of the EMR. The EMR at one or more holes and/or slits 1867 acts as a point source which produces an evanescent field that propagates into sample 1870. Such an example may be useful for fluorescence microscopy and other techniques. In one example, an objective lens 1895 (or other detection element) may be positioned to view and/or detect an energy from sample 1870. Although, FIG. 18 illustrates one or more holes and/or slits 1867 as a single hole/slit for exemplary purposes, a plurality of holes/slits may be used to provide a plurality of near-field effects in one or more samples. In one example, a single optical fiber, such as optical fiber 1835, may be employed to illuminate a plurality of holes/slits to provide a near-field effect. In an alternative embodiment, one or more holes and/or slits 1867 may have a width that is larger than the wavelength of the EMR in order to provide an evanescent field for TIRFM application.

In another embodiment, an optical fiber microscopy launch system and method may be utilized with TIR microscopy (e.g., totally internally reflected fluorescence microscopy, TIRFM). Features of an example optical fiber microscopy launch system and method will be described with respect to TIRFM below. Those skilled in the art will recognize from this disclosure that certain features may also apply to non-TIR microscopy utilizing an optical fiber microscopy launch system according to the present disclosure.

Figure 1:
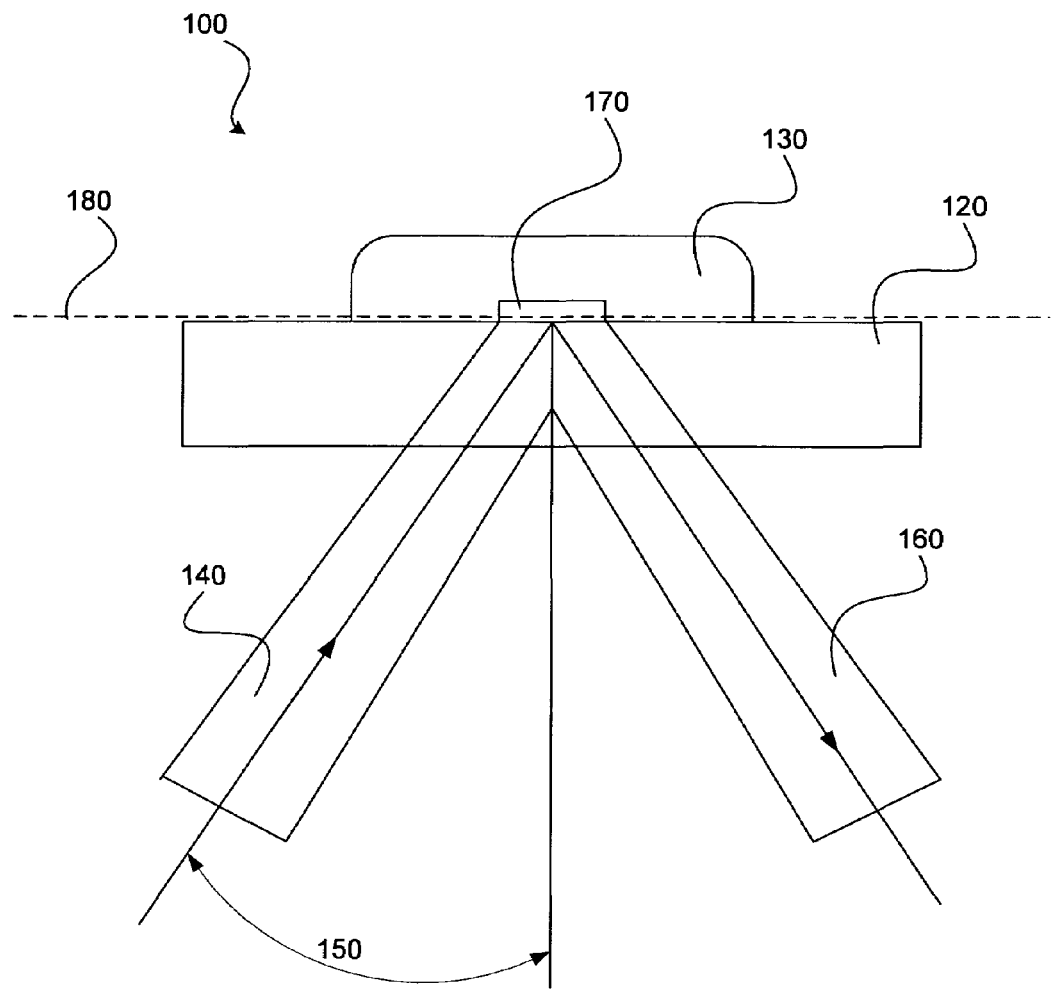
FIG. 1 shows one example of total internal reflection.

Referring again to FIG. 1, in TIRFM, when EMR is reflected off of a sample slide/sample interface, such as interface 110, at or above the critical angle, an evanescent electromagnetic field, such as evanescent field 170, is formed at the interface and decays exponentially into the sample. This field can be used as a fluorescence excitation source. One advantage of this excitation is that it has an extremely well defined area of excitation and shallow depth, resulting in only those fluorophores within the evanescent field being excited. This can dramatically reduce background fluorescence and improve signal to noise and spatial resolution.

Figure 19:
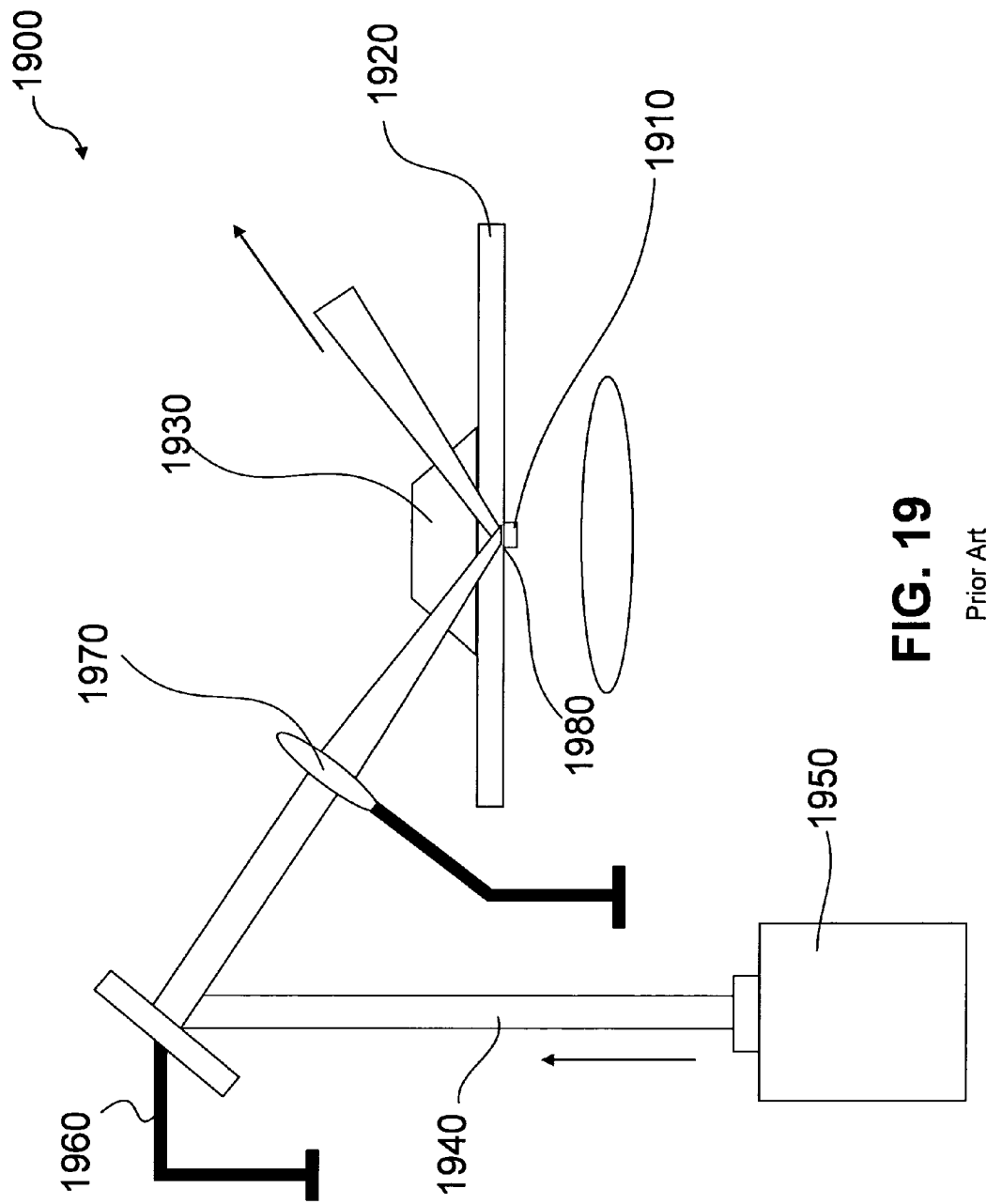
FIG. 19 shows one example of prism-type TIR microscopy.

In prior art systems and procedures, TIRFM is expensive. Part of the expense is related to the cost of complicated equipment needed to build a TIRFM microscope or to convert a non-TIRFM microscope to perform TIRFM. Two examples of TIRFM techniques include "prism-type" TIRFM and "through the lens" TIRFM. FIG. 19 illustrates one example of a prism-type TIRFM setup 1900. A sample 1910 is affixed to a sample slide 1920. A prism 1930 with appropriate optical properties, such as index of refraction, to match the optical properties of sample slide 1920 is positioned on the sample slide. Laser light 1940 from a source 1950 is reflected using optical equipment 1960 through focusing lens 1970 and into prism 1930. In this example, optical equipment 1960 is shown as a single mirror for simplicity. However, typically optical equipment 1960 would include various optical components needed to direct laser light 1940 from source 1950 at an appropriate angle to a microscope stage and into prism 1930. Prism 1930 directs laser light 1940 at an interface 1980 between sample 1910 and sample slide 1920 at or above the critical angle so as to induce TIR. One of the drawbacks to such a system is that it is difficult or impossible with typical microscopes to position optical equipment 1960 such that it translates with the microscope stage during focusing of the microscope. Changes in the position of the sample slide during focusing without corresponding changes in optical equipment 1960 and/or focusing lens 1970 can result in a negative impact on TIR, including loss of critical angle and/or alignment to the field of view.

Figure 20:
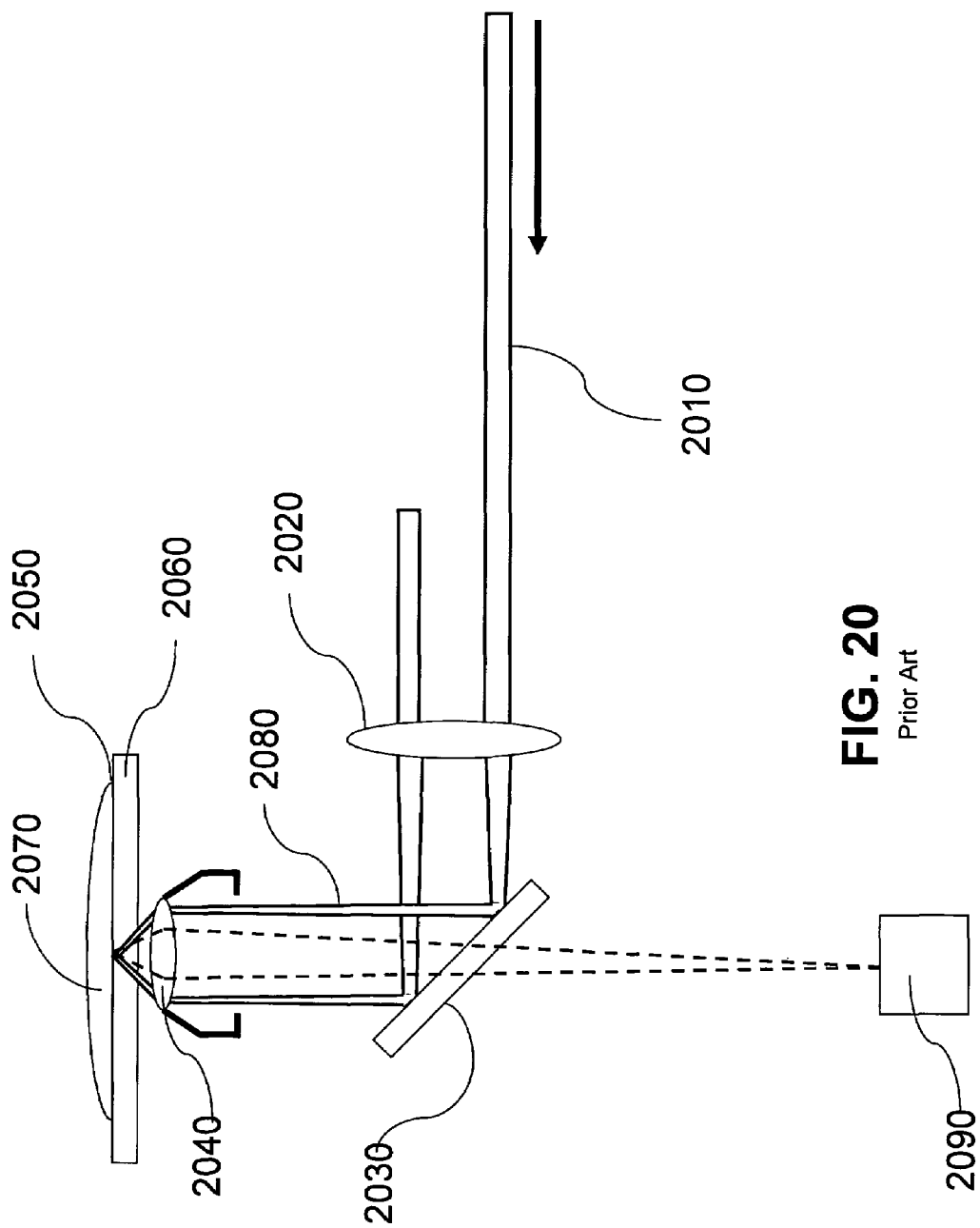
FIG. 20 shows one example of through-the-lens TIR microscopy.

FIG. 20 illustrates one example of "through the lens TIRFM." Incoming EMR 2010 passes through a focusing lens 2020 and is directed by a reflective element 2030 to an objective lens 2040. Incoming EMR 2010 is incident at an interface 2050 of a first material 2060 and a second material 2070. Total internally reflected energy 2080 is reflected back through objective lens 2040 and directed by reflective element 2030 through focusing lens 2020. Reflective element 2030 is selected to allow incoming EMR 2010 and TIR energy 2080 to reflect, while allowing desired viewing energy (such as fluorescence energy) to pass to an observation element 2090, such as a fluorescence detector or camera. Through the lens TIRFM requires high numerical aperture (NA) objective lenses to achieve TIR. In one example, an objective lens having an NA of 1.35 or more is required. In another example, an objective lens having an NA of 1.45 or more is required. One example where a system would benefit from an objective lens having an NA of 1.45 or more would be a glass/water interface.

Figure 21:
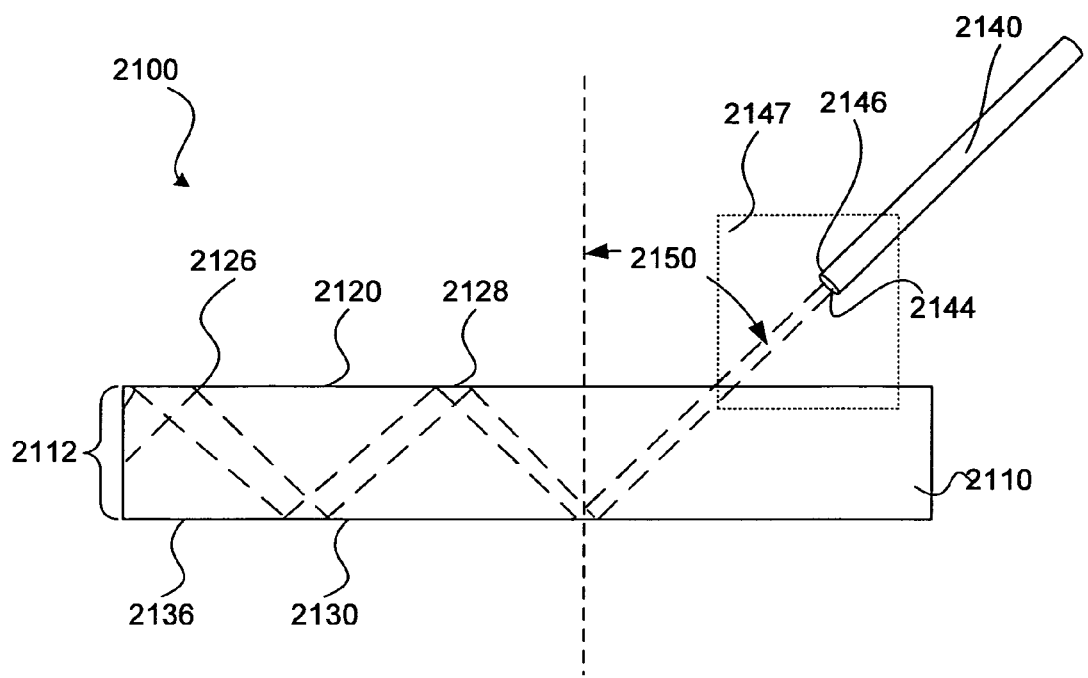
FIG. 21 shows one example of an optical fiber microscopy launch system.

FIG. 21 illustrates one example of a TIR system 2100 according to the present disclosure. TIR system 2100 includes a sample slide 2110 having a side 2120 and an opposing side 2130. Opposing side 2130 has a surface 2136. Side 2120 has a surface 2126. Sample slide 2110 has a width 2112. An optical fiber 2140, which includes a terminal end 2144 having a terminal surface 2146, is positioned proximate side 2120 so as to locate the terminal end to deliver EMR from the optical fiber into the sample slide 2110 to side 2130 at an incident angle 2150. Incident angle 2150 is at least equal to or greater than the critical angle for TIR at surface 2136. The delivery of EMR may be facilitated in any way that will allow the EMR to enter sample slide 2110 such that it is delivered to surface 2136 at or above a critical angle for TIR. Structure in sample slide 2110 or in addition to sample slide 2110 for this facilitation may take place in any location, such as location 2147. In this example, side 2120 and opposing side 2130 are substantially parallel to each other. In another example, illustrated in more detail below, an optical fiber is positioned proximate a side that is at an acute angle, such as an about 90 degree angle, to an opposing side. Examples of ways to facilitate delivery of EMR at or above a critical angle include those described herein and include, but are not limited to, use of mounting element, use of an optical coupling medium, and any combinations thereof.

Figure 22:
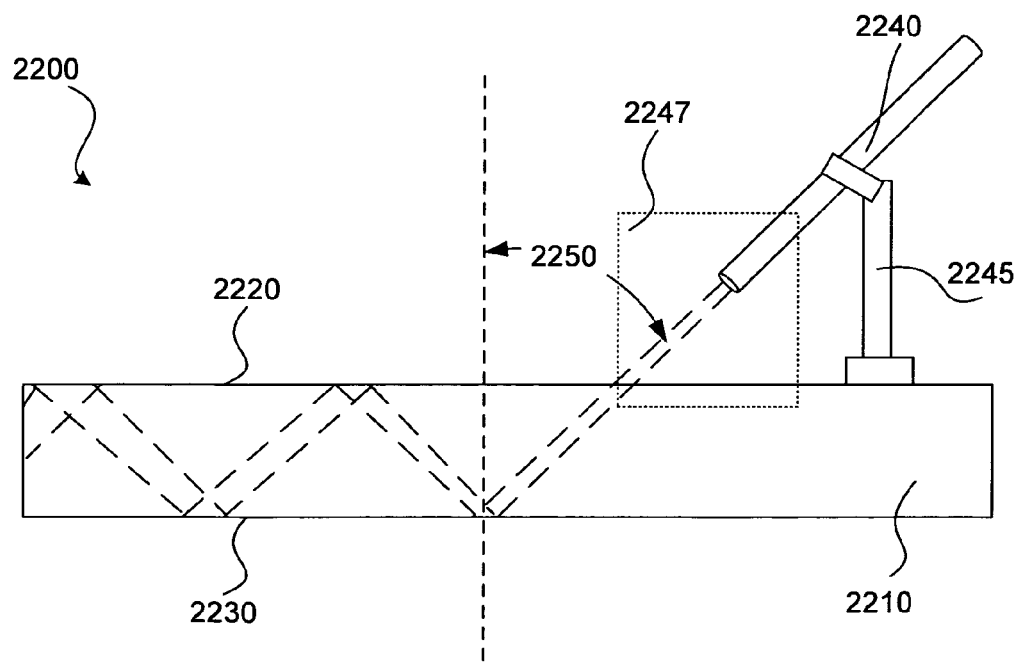
FIG. 22 shows another example of an optical fiber microscopy launch system.

FIG. 22 illustrates one example of a sample slide 2210 having a side 2220 and a side 2230. Optical fiber 2240 is held in position with respect to sample slide 2210 by one example of a mechanical coupling, i.e., mechanical coupling 2245, such that a critical angle 2250 is maintained. In this example one or more ways of facilitating delivery of EMR at or above a critical angle may be included in at least location 2247. Other examples of a mechanical coupling include, but are not limited to, thermoplastic molded assembly, optical adhesive, machined metal or plastic, and any combinations thereof.

Figure 23:
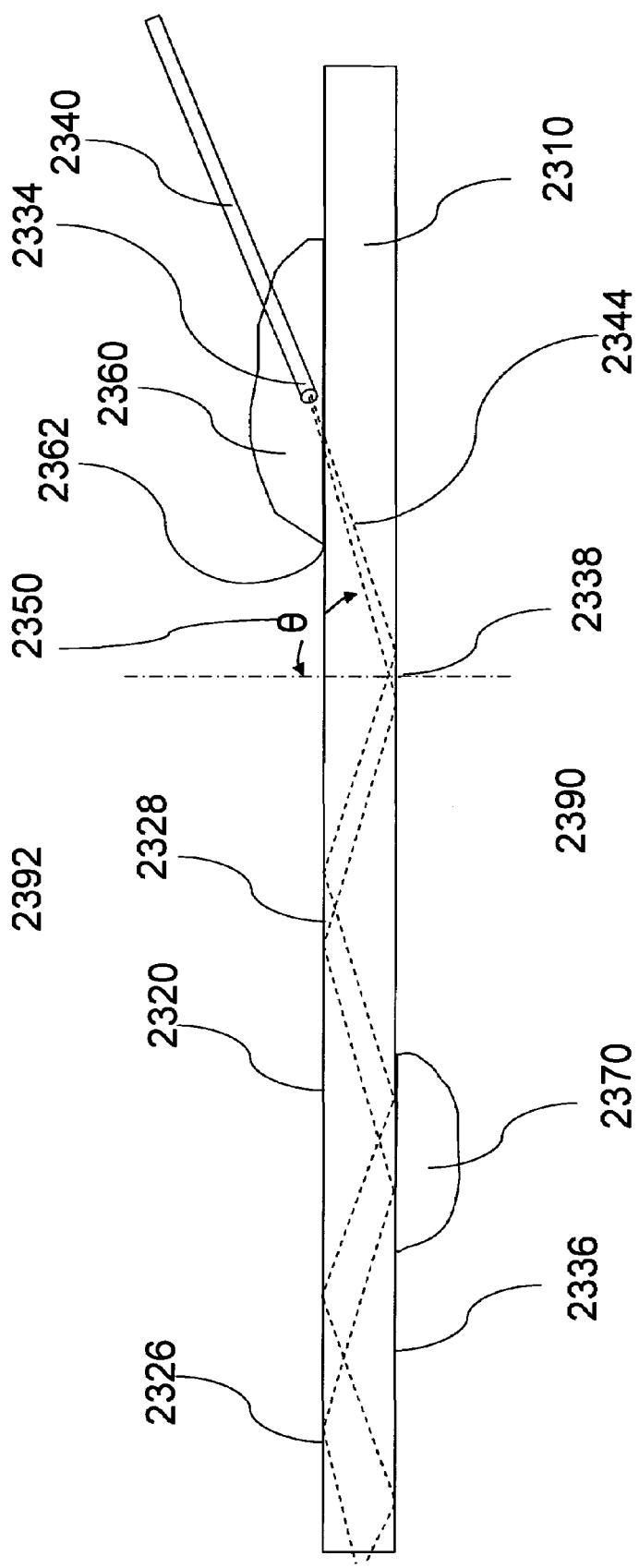
FIG. 23 shows yet another example of an optical fiber microscopy launch system.

FIG. 23 illustrates one example of a sample slide 2310 having a side 2320 (with surface 2326) and a side 2330 (with surface 2336). A terminal end 2334 of an optical fiber 2340 is positioned within an optical coupling medium 2360 (i.e., an optical fiber mounting element), which is in optical communication with sample slide 2310, such that a critical angle 2350 is maintained. In one example, a coupling medium does not interfere with continued TIR in a sample slide. EMR 2344 is incident at surface 2336 at critical angle 2350. EMR 2344 totally internally reflects at a point 2338. The first reflection of EMR 2344 on surface 2326 occurs at a point 2328. In FIG. 23, an edge 2362 of coupling medium 2360 is spaced from point 2338. If optical coupling medium 2360 were to extend over point 2328, EMR 2344 would pass through an interface between coupling medium 2360 and sample slide 2310, due to their respective indices of refraction. However, in an example such as that in FIG. 23, critical angle 2350 is chosen such that TIR occurs at the interface between sample slide 2310 and medium 2390, between sample slide 2310 and a medium 2392, and between sample slide 2310 and a sample 2370. In this example, sample 2370 is shown for illustrative purposes in optical communication with surface 2336 of second side 2330. One of ordinary skill will recognize that in use of sample slide 2310, sample 2370 may be at a different location, such as in optical communication with surface 2326 of first side 2320. In another example (not shown), the edge of a coupling medium may extend past the point at a surface, such as surface 2326, where EMR that has totally internally reflected from a surface of an opposing side impinges. In such an example, as mentioned above, the EMR would exit the sample slide at that point. TIR microscopy is still possible if the sample is positioned at the point of TIR at the surface of the opposing side. The sample will be subjected to the evanescent field produced by the TIR and the resultant fluorescence of any fluorophores can be observed.

Figure 24:
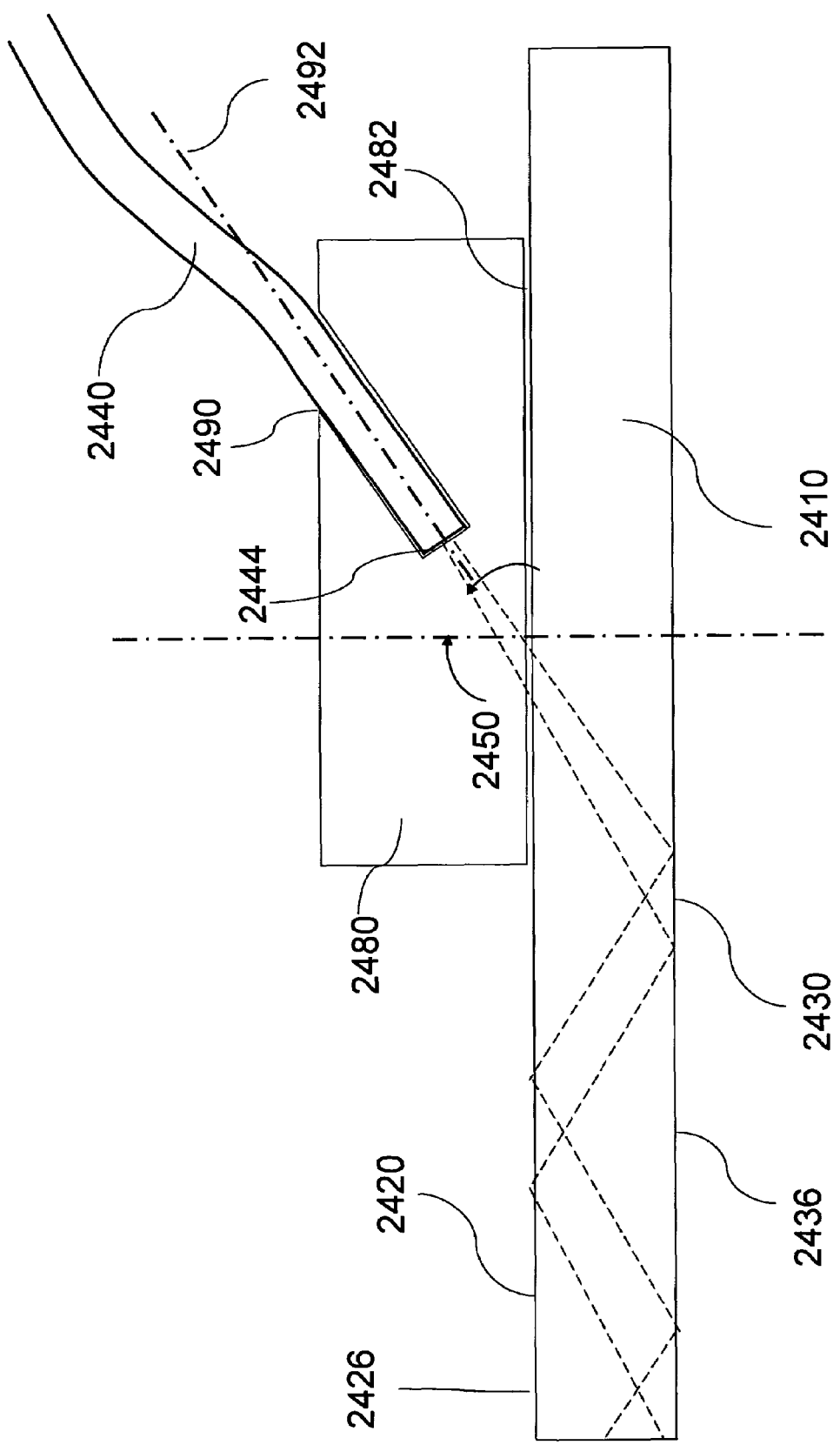
FIG. 24 shows still another example of an optical fiber microscopy launch system.

FIG. 24 illustrates an example optical fiber mounting element 2480. Optical fiber mounting element 2480 includes a fiber insertion portal 2490 having a fiber insertion axis 2492. A side 2482 of optical fiber mounting element 2480 is in optical communication with a side 2420 of a sample slide 2410. Fiber insertion portal 2490 has an optical fiber 2440 therein at a position such that EMR from a terminal end 2444 of the optical fiber is incident at a surface 2436 of a second side 2430 of sample slide 2410 at an angle 2450 that is at least equal to or greater than a critical angle for TIR.

Figure 25:
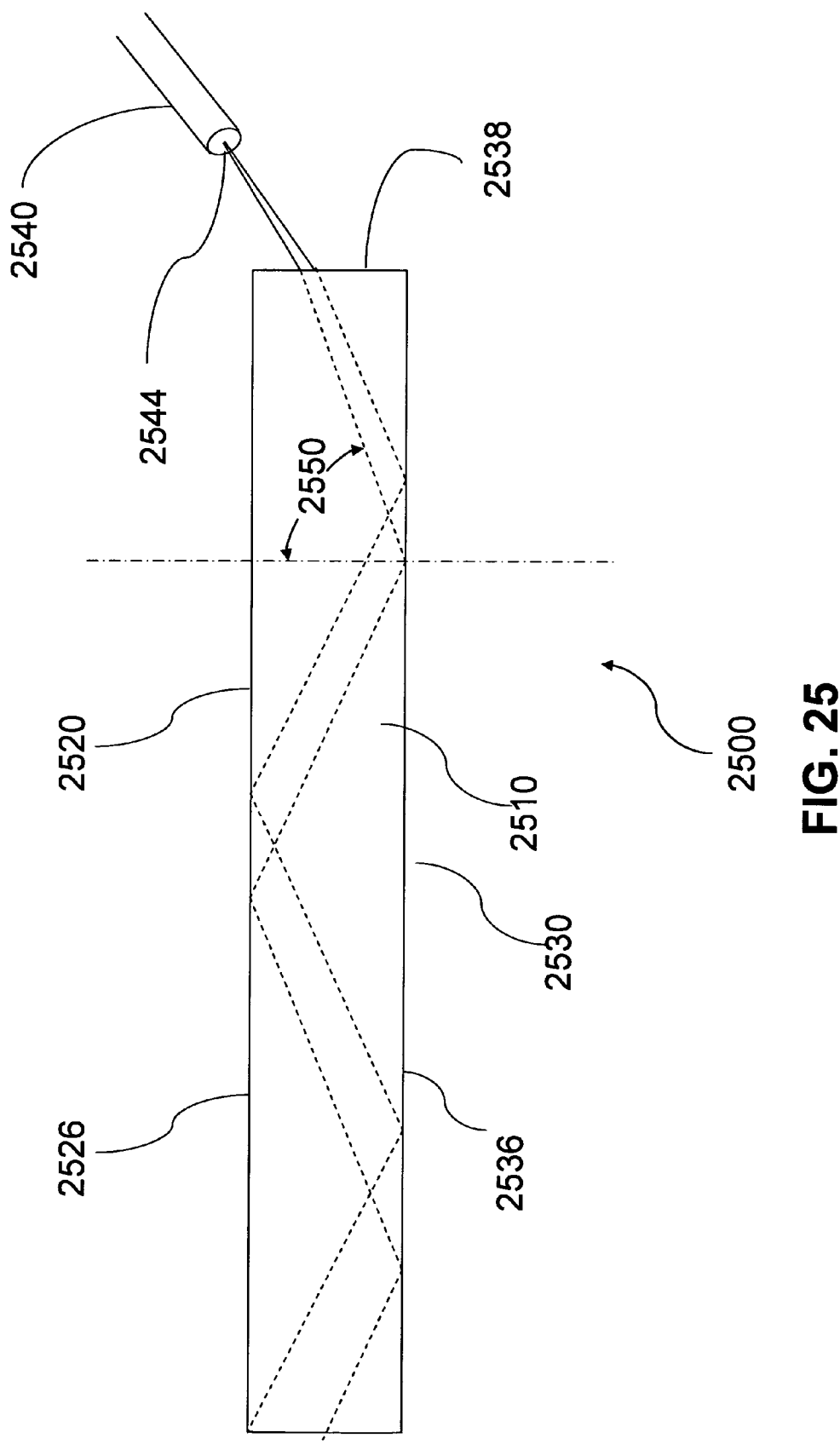
FIG. 25 shows still yet another example of an optical fiber microscopy launch system.

FIG. 25 illustrates another example of a TIR system 2500. A sample slide 2510 includes a side 2520, a side 2530, and a side 2538. Side 2530 includes a surface 2536. Side 2538 is at an acute angle to side 2530. An optical fiber 2540, having a terminal end 2544, is positioned proximate side 2538 of sample slide 2510 so to deliver EMR from terminal end 2544 to surface 2536 of side 2530 at an incident angle 2550. Incident angle 2550 is at least a critical angle for TIR. Optical fiber 2540 can be positioned with any of the ways discussed herein including, but not limited to, mechanical coupling, mounting element (e.g., optical coupling medium, fiber insertion portal, etc.), and any combinations thereof. As is also clear from this disclosure, optical fiber 2540 alternatively could have been positioned proximate other sides with a different opposing side at which TIR would be initiated. In one example, optical fiber 2540 could have been positioned proximate side 2530 with side 2520 being the opposing side at which TIR would be initiated. In an another example, optical fiber 2540 positioned proximate side 2538 could be positioned so to deliver EMR to surface 2526 at an angle that is at least a critical angle for TIR. It is contemplated that the various alternative placements of an optical fiber equally apply to the other examples and embodiments disclosed herein.

Figure 26:
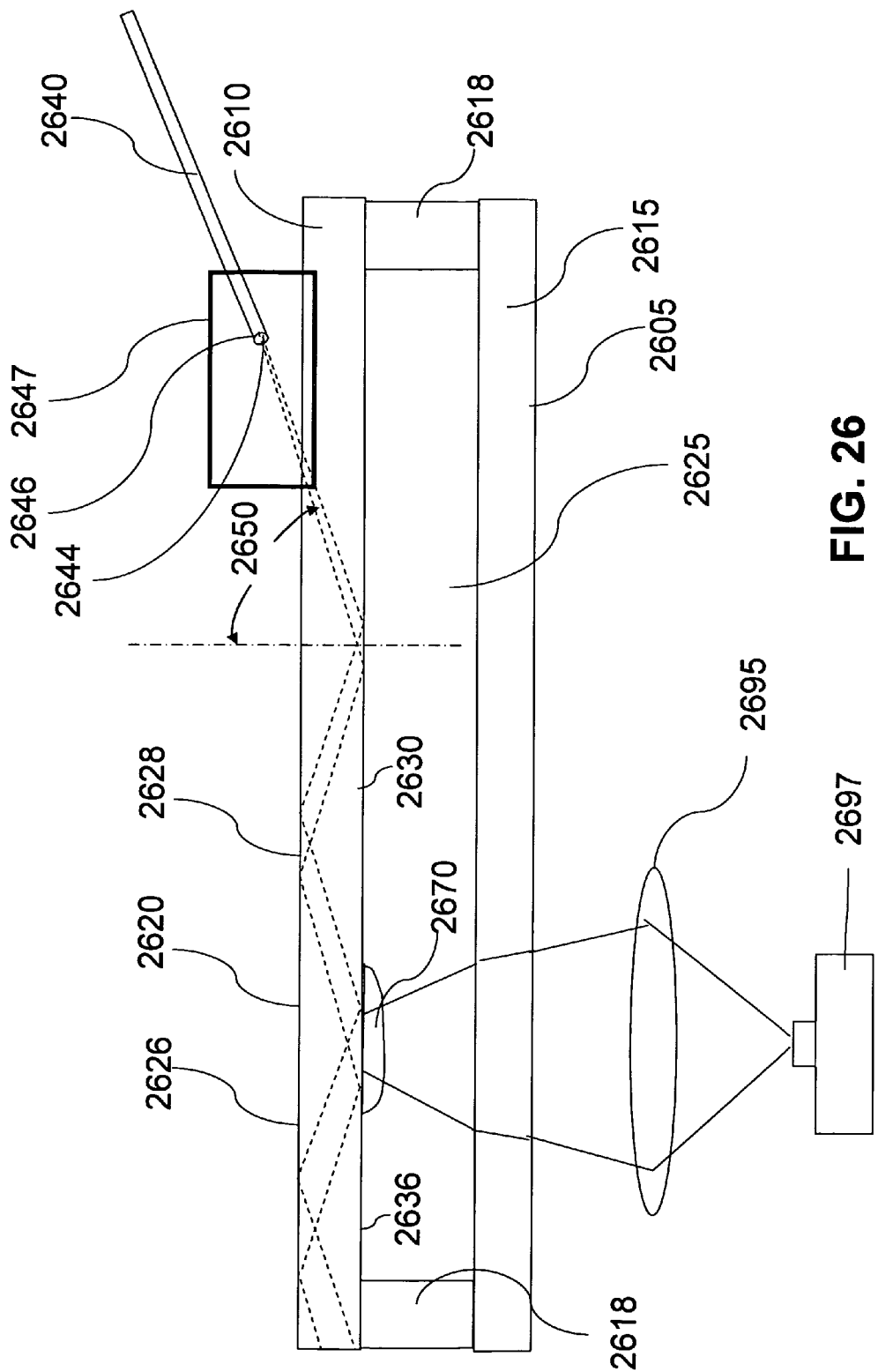
FIG. 26 shows one example of an optical fiber microscopy launch system including a sample chamber.

A sample slide may be part of a sample chamber. One of ordinary skill will be familiar with a variety of sample chambers. One example of a sample chamber having a sample slide according to the present disclosure is illustrated in FIG. 26. A sample chamber 2605 includes a sample slide 2610. Sample chamber 2605 includes sample slide 2610 as a top portion and an enclosing element 2615, such as a cover slip, as a lower portion. A spacer 2618 is positioned between sample slide 2610 and enclosing element 2615 to form a chamber area 2625. Sample slide 2610 includes a side 2620 and an opposing side 2630 with a surface 2636. An optical fiber 2640 is positioned proximate side 2620 so as to position optical fiber 2640 to deliver an EMR from its terminal end 2644 having a terminal surface 2646 into sample slide 2610 by one or more ways of facilitating delivery of EMR located at least partially within location 2647 at an angle 2650 that is at least a critical angle for TIR at surface 2636. Optical fiber 2640 can be positioned in any of the ways discussed in this disclosure. One non-limiting example of such a way would be using a mounting element with a fiber insertion portal as discussed above. Although optical fiber 2640 is positioned in FIG. 26 proximate side 2620, as previously discussed, optical fiber 2640 can alternatively be positioned proximate another side of sample slide 2610. In the example of FIG. 26, a sample 2670 is positioned at surface 2636. When EMR is delivered to surface 2636 at or above a critical angle for TIR, the EMR totally internally reflects causing an evanescent wave that emanates from surface 2636 into sample 2670 causing any fluorophores present in the evanescent wave to fluoresce. As is the case with any of the embodiments and examples described herein, fluorescence of a sample can be detected by a fluorescence detection element, such as fluorescence detection element 2697 in FIG. 26. Fluorescence detection element 2697 is positioned to view fluorescence via microscope optics 2695.

Examples of fluorescence detection elements include, but are not limited to, film; video camera, such as an intensity-enhanced video camera; charged coupled diode (CCD), such as a cooled scientific CCD; avalanche photodiode; photomultiplier; time-lapse cinemicrography; silicon photodiode; and any combinations thereof.

In a further embodiment, multiple optical fibers may be utilized in an optical fiber launching system and/or method of the present disclosure. The multiple optical fibers may be brought into proximity to a side of a sample slide in a variety of ways as described herein with reference to the single optical fiber examples. Examples of how to bring multiple fibers into proximity to a side of a sample slide according to the present disclosure include, but are not limited to, having multiple optical fibers optical communication with a single optical fiber mounting element, having each optical fiber in optical communication with a different optical fiber mounting element, and any combinations thereof. The multiple optical fibers may be arranged in a variety of ways to achieve differing results with respect to directing EMR through a sample slide to an opposing side of the sample slide (e.g., for TIR, transmission to a sample, and a combination thereof). Examples of arrangements of multiple fibers include, but are not limited to, having terminal ends directing EMR perpendicular to each other, having terminal ends directing EMR parallel to each other, having terminal ends directing EMR such that the EMR from each optical fiber overlaps, having terminal ends directing EMR such that the EMR is directed at different portions of an opposing side of a sample slide, and any combinations thereof.

Example applications for multiple optical fibers include, but are not limited to, illuminating and/or providing excitation energy to different regions of a single sample in proximity to a sample slide, illuminating and/or providing excitation energy to multiple samples in proximity to a sample slide, providing EMR having multiple polarization states, providing EMR having multiple wavelengths to a single location, providing EMR having multiple wavelengths to multiple locations, and any combinations thereof. In one example, multiple optical fibers may be provided that are aligned substantially parallel to each other with at least one optical fiber providing an EMR through a sample slide to an opposing side such that the EMR is polarized perpendicular to a surface of the opposing side and at least one other optical fiber providing an EMR through the sample slide to the opposing side such that the EMR is polarized parallel to the surface of the opposing side. Such an orthogonal arrangement of polarization may also be obtained positioning the multiple fibers substantially perpendicular to each other. Those skilled in the art will recognize numerous applications (e.g., TIR applications) that require known and/or controlled polarization and/or wavelength. Applications include, but are not limited to providing excitation energy to single fluorescent molecules and quantum dots, providing excitation energy to fluorescent molecules that require excitation at different wavelengths, triggering a photo activated compound (e.g., blebbistatin) by specific wavelengths, and any combinations thereof. In an alternative embodiment, multiple wavelengths of EMR may be delivered via a single optical fiber. In one example, an optical fiber having multiple wavelength capacity as is known to those of ordinary skill may be utilized with a wavelength selecting element (e.g., a dichotic mirror, one or more shutters, multiple lasers, an Acouso-Optic-Tunable-Filter (AOTF), or any combination thereof) to select the desired multiple wavelengths entering the optical fiber. In another example, multiple wavelengths may be alternated on an optical fiber. In yet another example, multiple wavelengths may be simultaneously transmitted on an optical fiber. In still another example, an intensity of a wavelength on an optical fiber may be modulated.

In one example, wavelength and polarization control may be combined to allow integrating fluorescent molecule orientation information with two or more types of fluorescent molecules. For example, there may be two or more different wavelength (color) florescent molecules, each color could be specifically oriented to a unique region on biological molecules in a repeating pattern ensemble. When the biological molecules make a conformational change, angular orientation changes could be measured providing unique information for each region labeled. This is possible with single or multiple molecule applications.

Figure 27:
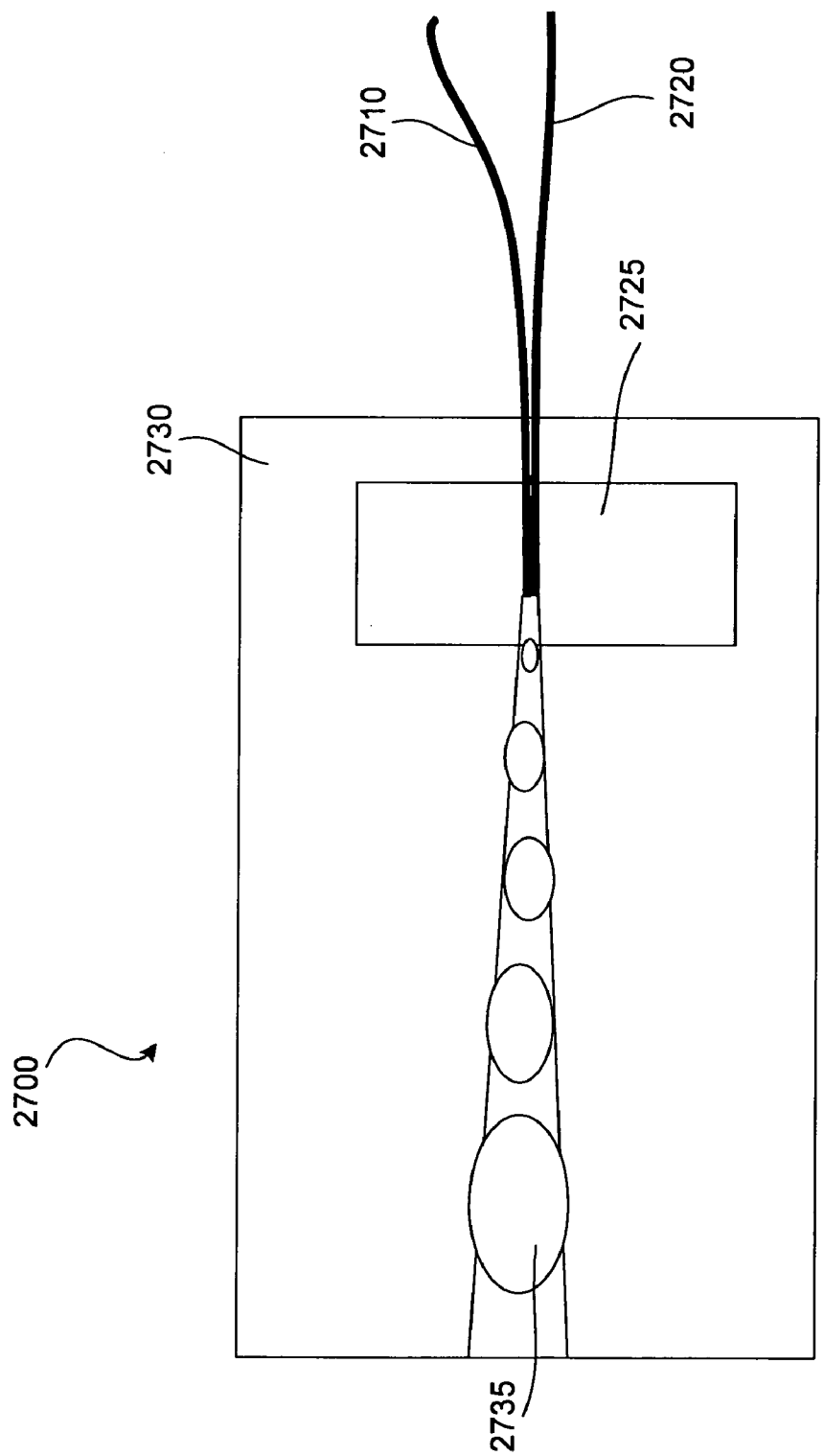
FIG. 27 shows one embodiment of a multiple optical fiber microscopy launch system.

FIG. 27 illustrates a top plan view of one example of an optical fiber launch system 2700 utilizing an optical fiber 2710 and an optical fiber 2720 aligned via an optical fiber mounting element 2725 such that EMR from their terminal ends is directed substantially parallel to each other through sample slide 2730. The parallel EMR totally internally reflects causing overlapping evanescent fields 2735 alternating from the opposing opposite surface of sample slide 2730 and the top surface of sample slide 2730. The EMR from each optical fiber may have similar or different characteristics (e.g., wavelength and/or polarization).

Figure 28:
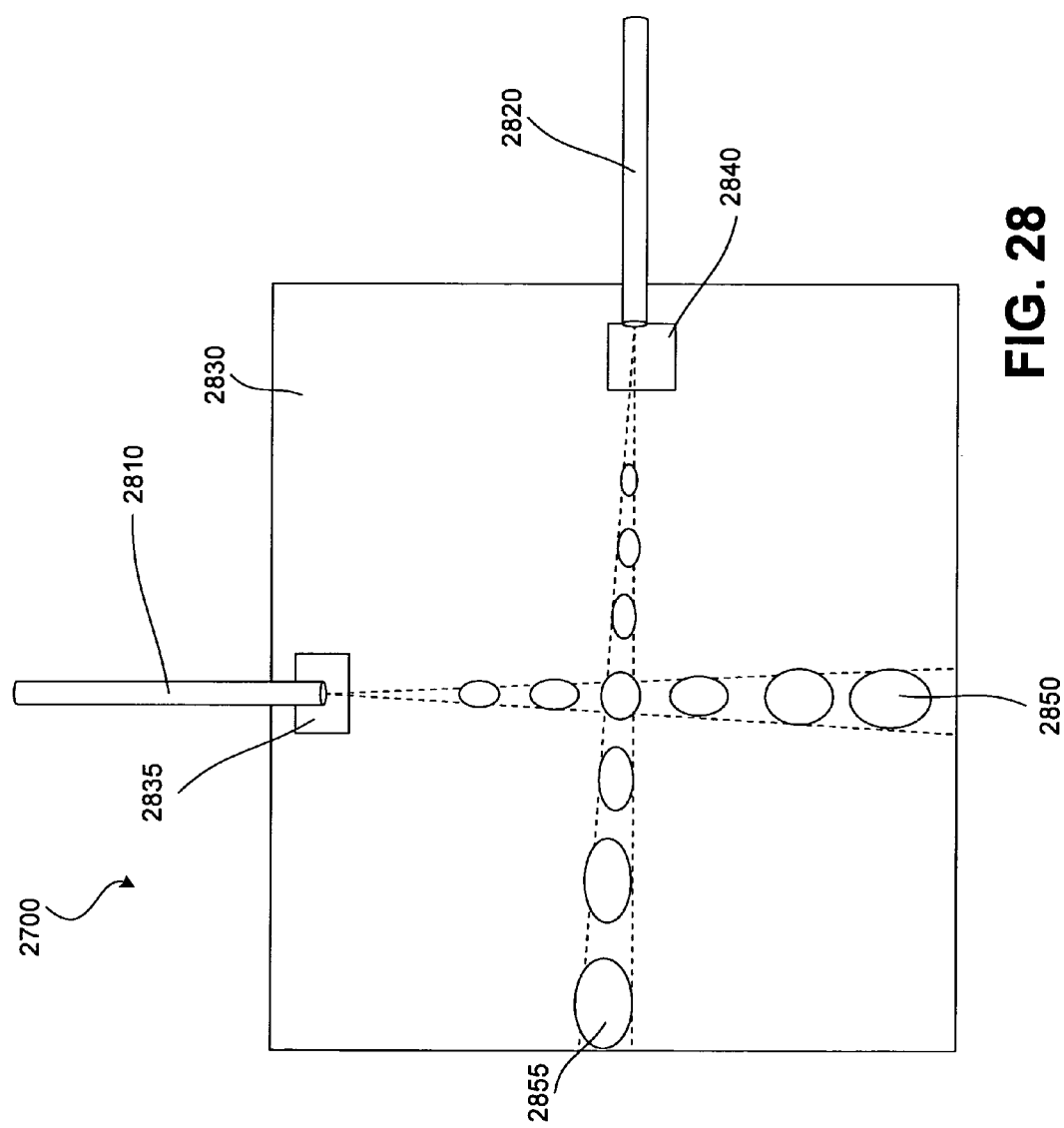
FIG. 28 shows another embodiment of a multiple optical fiber microscopy launch system.

FIG. 28 illustrates a top plan view of another example of an optical fiber launch system 2800 utilizing an optical fiber 2810 and an optical fiber 2820 aligned such that EMR from their terminal ends is directed substantially perpendicular to each other through sample slide 2830. Optical fiber 2810 is positioned via optical fiber mounting element 2835 and directs EMR through sample slide 2830 to an opposing surface of sample slide 2830 at an incident angle that is at least a critical angle for TIR. Optical fiber 2820 is positioned via optical fiber mounting element 2840 and directs EMR through sample slide 2830 to an opposing surface of sample slide 2830 at an incident angle that is at least a critical angle for TIR. Totally internally reflected EMR from optical fiber 2810 produces evanescent fields 2850. Totally internally reflected EMR from optical fiber 2820 produces evanescent fields 2855. Evanescent fields 2850 and 2855 overlap at region 2860. The EMR from each optical fiber may have similar or different characteristics (e.g., wavelength and/or polarization).

In another embodiment of the present disclosure, a microscope is provided that includes a system of the present disclosure. A system or a method of the present disclosure may be used with a variety of microscopes that are currently configured for various desired techniques (e.g., TIR microscopy) or that are not currently configured for the desired techniques (e.g., TIR microscopy). Examples of microscopes include, but are not limited to, an inverted microscope, an upright microscope, stereoscopic microscope, confocal detection microscope, and scanning confocal detection.

In yet another embodiment of the present disclosure, a system for modifying a microscope to perform TIR microscopy is provided. In one example, a microscope may be modified to perform TIR microscopy with an optical fiber microscopy launching system of the present disclosure. Such a system for modifying a microscope may include a sample slide having a first side and an opposing side with a surface, and an optical fiber having a first terminal end with a terminal surface, the optical fiber being positioned proximate the first side so as to position the optical fiber to deliver an EMR from the first terminal end to the surface of the opposing side at a desired incident angle (e.g., at least a critical angle for TIR). Another example of a system for modifying a microscope may include a sample slide as described herein configured to receive an optical fiber at a position to deliver EMR to an opposing surface of the sample slide at a desired incident angle (e.g., at least a critical angle for TIR). Yet another example of a system for modifying a microscope and/or a sample slide may include a mounting element as described herein that is capable of being optically coupled to a standard sample slide. In another example, a system for modifying a microscope according to the present disclosure may also include a fluorescence detection element that can be fit to the microscope so as to view fluorescence of a sample positioned at the sample slide. Another example of a system for modifying a microscope according to the present disclosure includes a source of EMR either attached to a second terminal end of an optical fiber or capable of being attached to the second terminal end, so as to provide EMR to the first terminal end having the terminal surface for delivery to an opposing surface of a sample slide.

Figure 29:
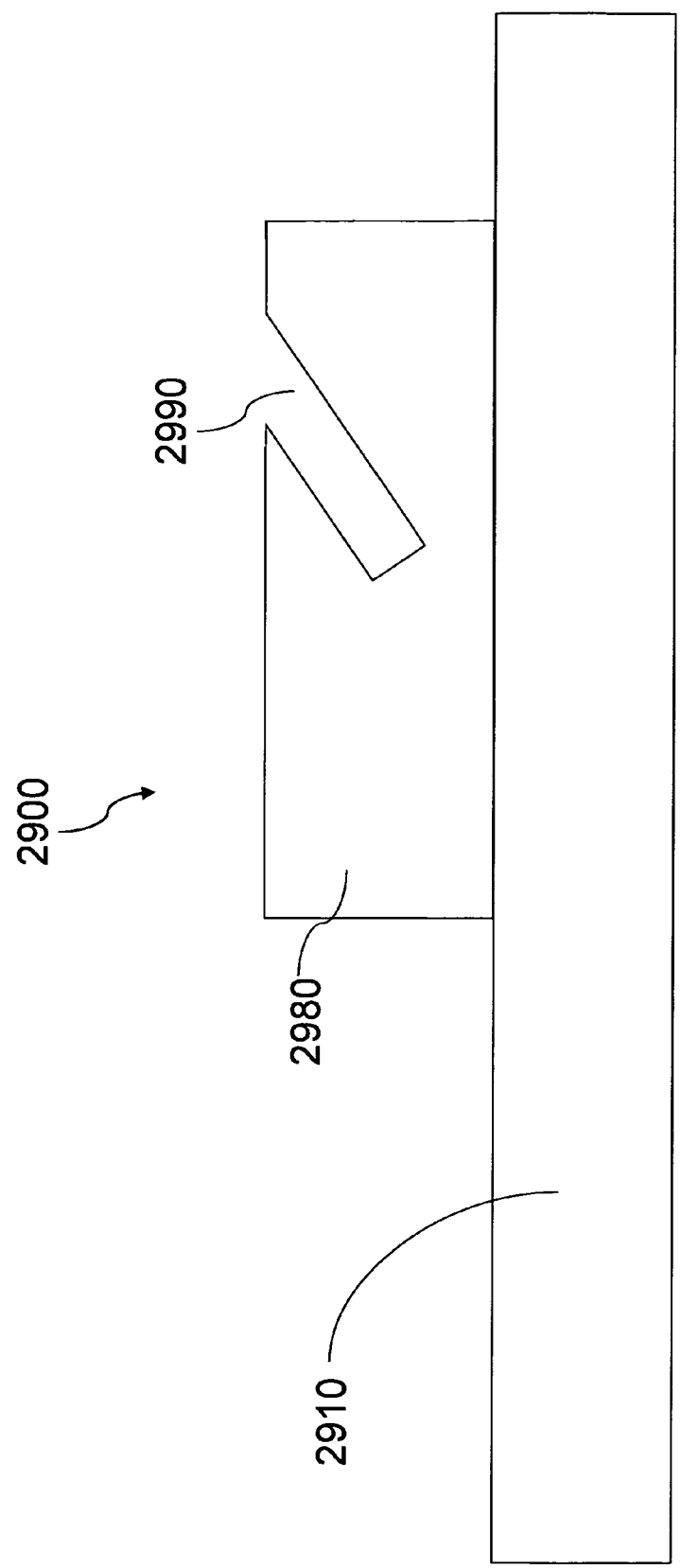
FIG. 29 shows one example of a system for modifying a microscope.
Figure 30:
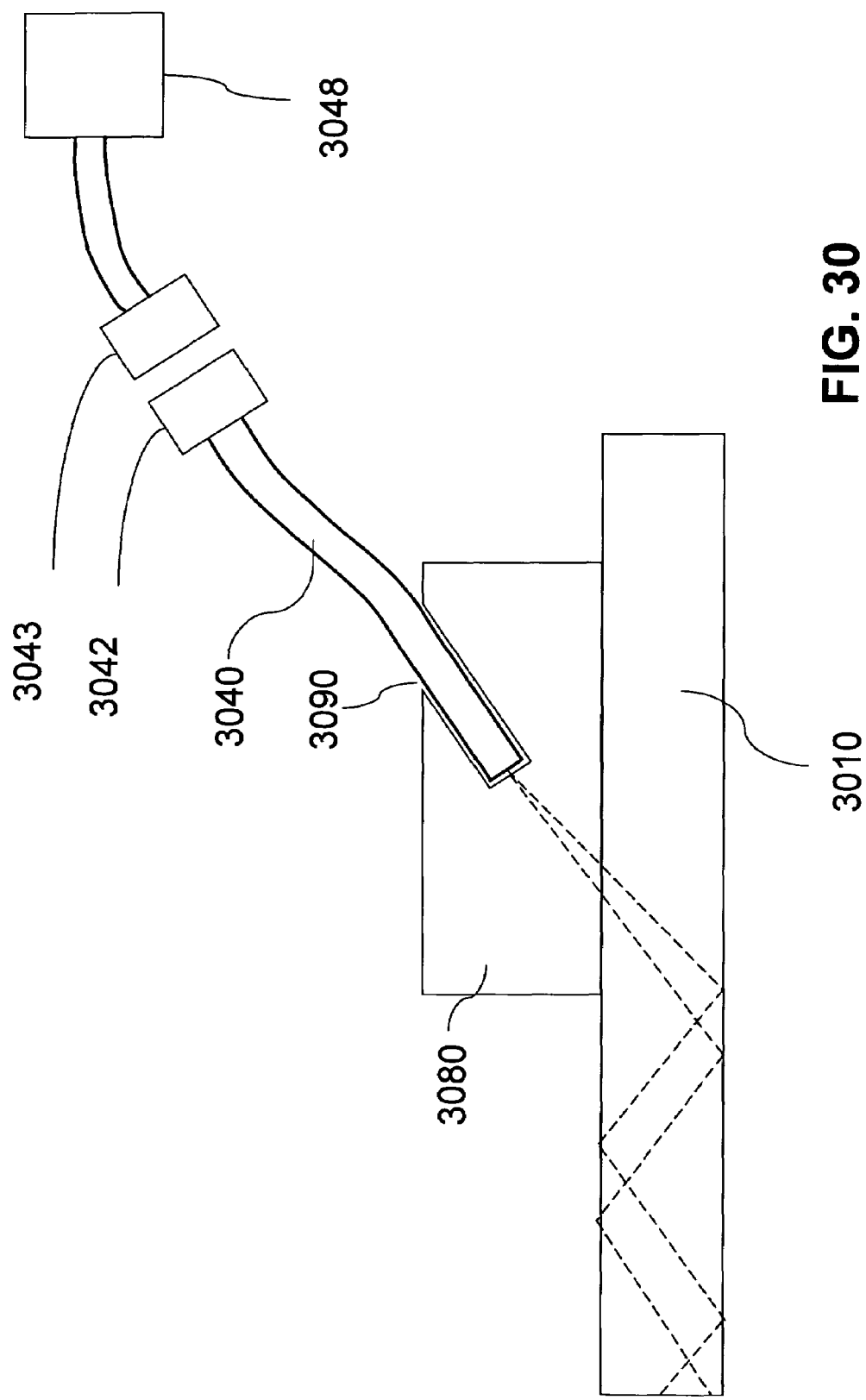
FIG. 30 shows another example of a system for modifying a microscope.
Figure 31:
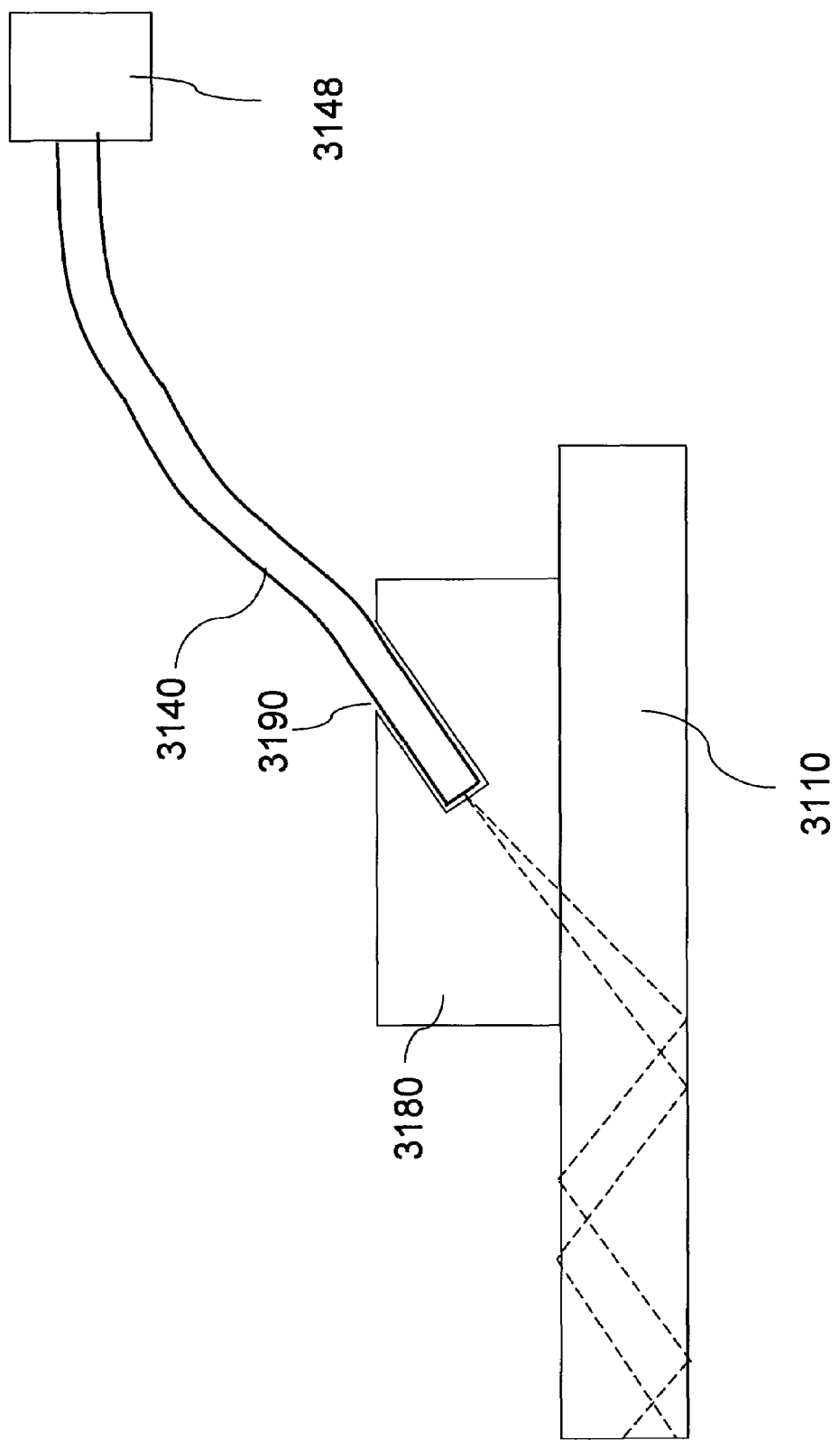
FIG. 31 shows yet another example of a system for modifying a microscope.
Figure 32:
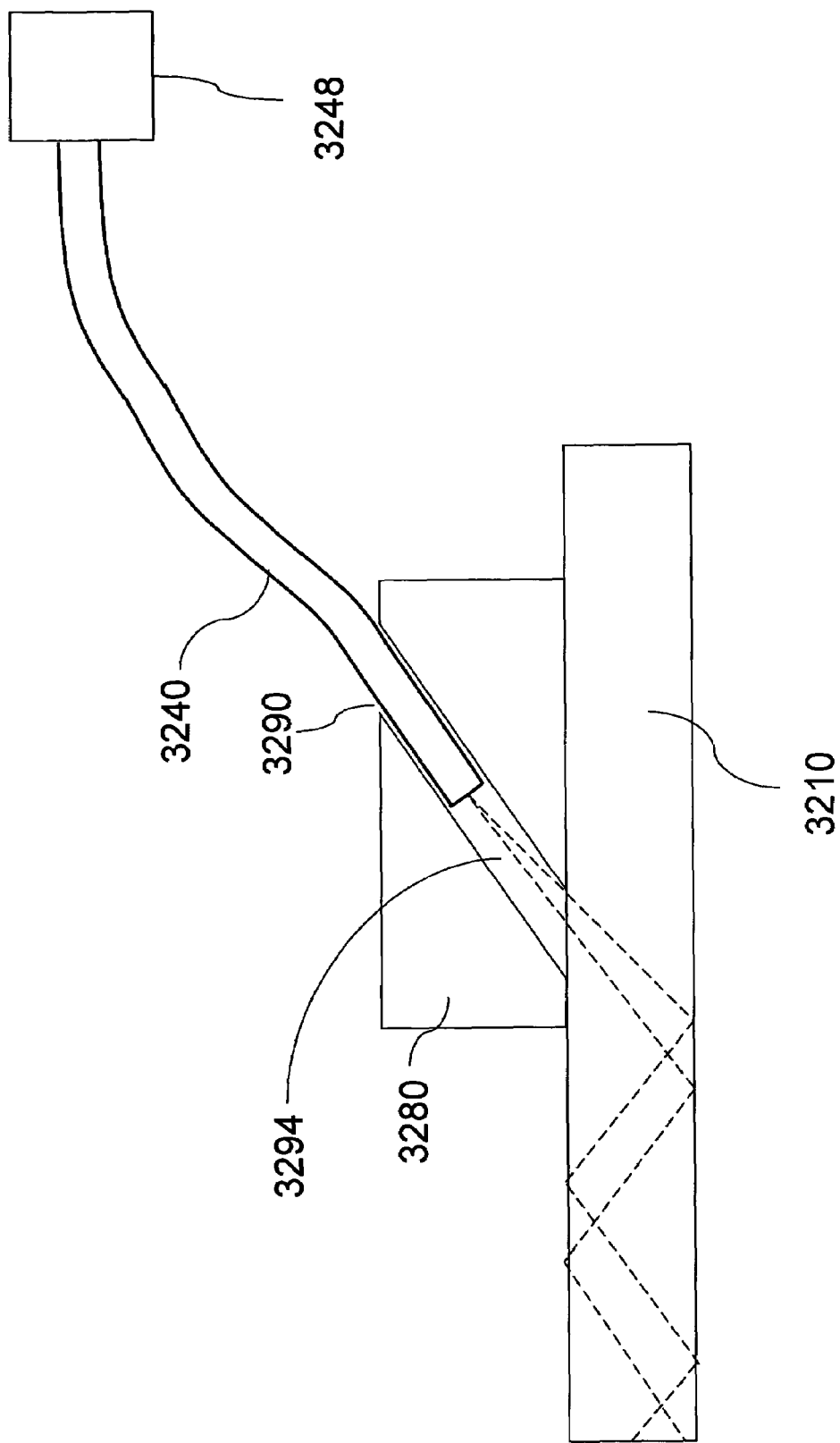
FIG. 32 shows still another example of a system for modifying a microscope.

Referring to FIGS. 29 to 32, four example systems for modifying a microscope are illustrated. FIG. 29 illustrates an example system 2900 for modifying a microscope. System 2900 includes a sample slide 2910 in optical communication with a mounting element 2980 having a fiber insertion portal 2990 according to the present disclosure. A sample may be placed on a surface of sample slide 2910 as described herein and an optical fiber optically coupled with optical fiber mounting element 2980 at fiber insertion portal 2990. FIG. 30 illustrates an example system 3000 for modifying a microscope. System 3000 includes a sample slide 3010 in optical communication with a mounting element 3080 having a fiber insertion portal 3090 according to the present disclosure. Optical fiber 3040 is in fiber insertion portal 3090. Optical fiber 3040 includes optical coupling 3042 for connecting to optical coupling 3043 of EMR source 3048. FIG. 31 illustrates a sample slide 3110 in optical communication with a mounting element 3180 having a fiber insertion portal 3190 according to the present disclosure. Optical fiber 3140 is inserted in fiber insertion portal 3190. Optical fiber 3140 is in optical communication with EMR source 3148. FIG. 32 illustrates a sample slide 3210 in optical communication with the optical fiber 3240 with the implementation of a coupling medium 3294, such as optical coupling oil 3294. Each of these examples may also be provided with a fluorescence detector. The examples in FIGS. 29 to 32 show a mounting element. As should be clear from the present disclosure, a rectangular mounting element may be replaced by another way of positioning an optical fiber, including, but not limited to another optical fiber mounting element (e.g., an optical coupling medium, a fiber insertion portal in the sample slide), a mechanical coupling, and any combinations thereof.

Figure 33A:
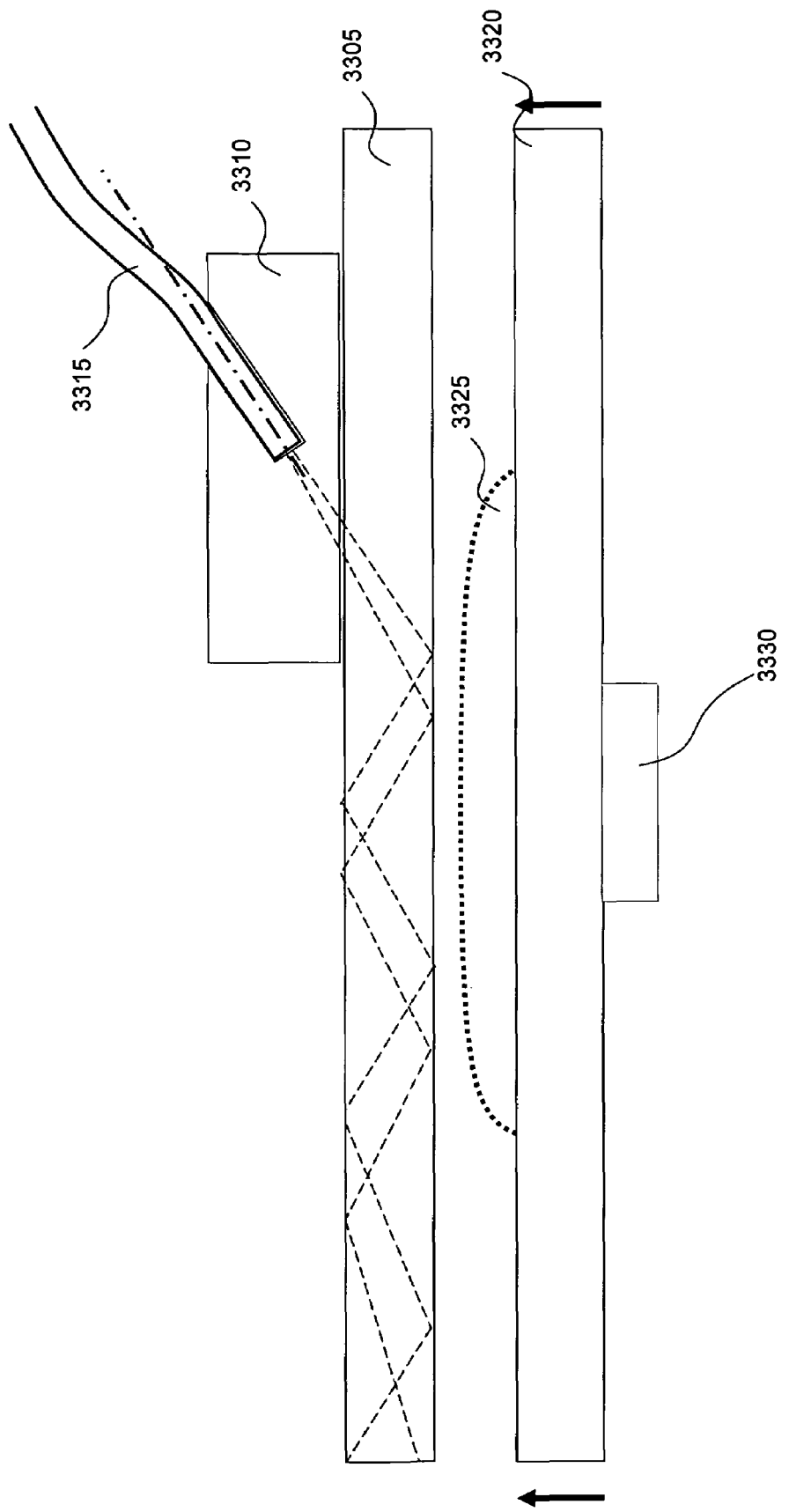
FIGS. 33A and 33B show one example of an optical fiber microscopy launch system.
Figure 33B:
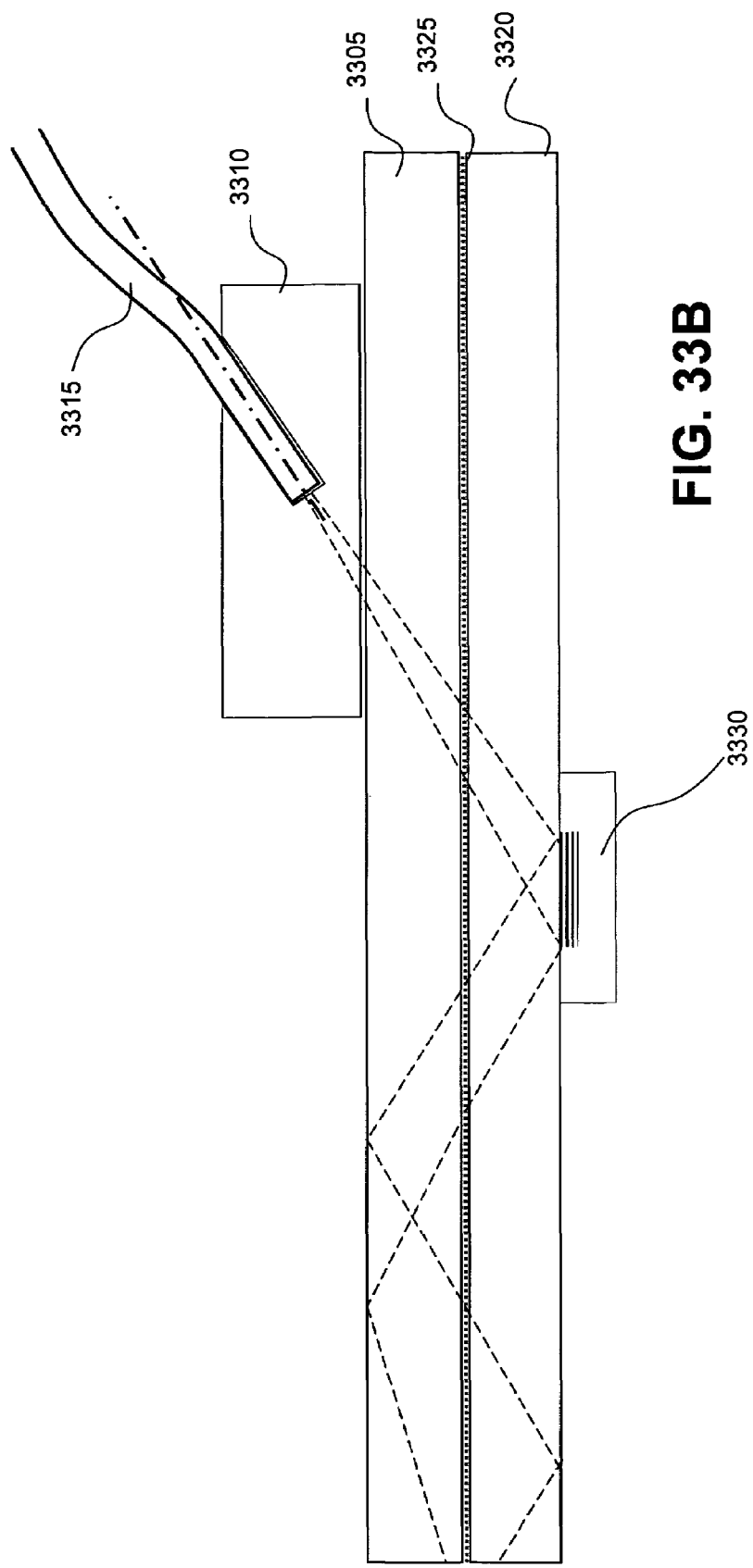

FIG. 33A illustrates a further embodiment of an optical fiber microscopy launch system 3300. System 3300 includes a first sample slide 3305 and an optical fiber mounting element 3310 having an optical fiber 3315 optically coupled thereto. System 3300 also includes a second sample slide 3320 and a coupling medium 3325. In one example, second sample slide 3320 may be used to position a sample 3330. Second sample slide 3320 may be readily disposable after one or more uses, while first sample slide 3305 may be continually utilized with subsequent sample slides. FIG. 33B illustrates second sample slide 3320 brought into optical communication with first samples slide 3305 such that EMR from optical fiber 3315 totally internally reflects at a surface 3340 of second sample slide 3320.

In still another embodiment of the present disclosure, a method of performing TIR microscopy is provided. The method includes providing a sample slide having a first side, a second side, and a third side, the first side having a first surface, the second side having a second surface. The method also includes positioning an optical fiber at a first position, the optical fiber having a terminal end with a terminal surface. The first position is proximate the third side so as to position the optical fiber to deliver an EMR from the first terminal end to the second surface at a first incident angle, the first incident angle being at least a critical angle for TIR at the second surface. The method may also include providing a sample in contact with the first surface. The method may further include delivering the EMR to the second surface and observing a fluorescence from the sample. In this embodiment, the first, second, and third sides may be different sides or same sides. The positioning of the optical fiber can be done by any way set forth in this disclosure.

In a further embodiment of the present disclosure, a method of modifying a sample slide for TIR microscopy is provided. The sample slide includes a first side and a second side, the second side having a first surface. The method includes positioning an optical fiber at a first position, the optical fiber having a terminal end with a terminal surface. The first position is proximate the first side so as to position the optical fiber to deliver an EMR from the first terminal end to the first surface at a first incident angle, the first incident angle being at least a critical angle for TIR at the second surface. The positioning of the optical fiber can be done by any way set forth in this disclosure.

In yet a further embodiment of the present disclosure, a method of modifying a microscope for TIR microscopy is provided. The method includes providing a sample slide having a first side and a second side, the second side having a first surface. The method also includes positioning an optical fiber at a first position, the optical fiber having a terminal end with a terminal surface. The first position is proximate the first side so as to position the optical fiber to deliver an EMR from the first terminal end to the first surface at a first incident angle, the first incident angle being at least a critical angle for TIR at the first surface. The sample slide is positioned with respect to the microscope to allow observation of fluorescence of a sample positioned at the sample slide. The positioning of the optical fiber can be done by any way set forth in this disclosure.

One of ordinary skill will recognize that other methods, such as methods of performing TIR, modifying a sample slide, and/or modifying a microscope, are clearly supported using the system of the present disclosure described in the multiple embodiments above.

Depending on the context of use, the present disclosure may provide benefits over previous microscopy techniques. One potential benefit includes the ability to perform a desired microscopy technique, relatively inexpensively, on just about any existing microscope with minor modification. The small amount of equipment needed to deliver excitation and or illumination EMR to a sample slide allows for easy access to the sample. Further, alignment of the EMR is fixed to the sample slide so that movement of the sample slide, such as movement during focusing, does not disturb alignment of the EMR to the sample slide. Complicated optical equipment is not needed to deliver EMR from a source to the microscope sample stage. The system and method of the present disclosure can be used with a variety of microscopes of a variety of configurations, including (but not limited to) those that are inverted and non-inverted configurations. Traditional illumination techniques (such as, but not limited to, brightfield, darkfield, phase contrast, differential interference contrast, confocal detection, and any combinations thereof) can be used to illuminate the sample and view through typical microscope optics. This is due to the fact that an entry area of EMR into a sample slide can be positioned away from the sample area. Some previous prism-type techniques for TIR obstructed the sample area from some methods of illumination. A system of the present disclosure can be made to be disposable after any number of uses. This can eliminate the need to clean sample slides and the negative effects of buildup on sample slide surfaces. For example, a system including a sample slide coupled with an optical fiber having a second end with a standard termination could be removably coupled to an EMR source and disposed of after one or more uses. Another potential benefit of an example optical fiber launch system of the present disclosure may include the ability to move a sample slide with respect to a microscope or other external element without impacting the position and/or orientation of a terminal end of an optical fiber with respect to the samples slide, thus keeping the ability to have the same incident angle at a sample surface despite movement of the sample slide (e.g., movement during focusing).

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A launch system for total internal reflection (TIR) microscopy, the system comprising:
    a sample slide having a plurality of sides, each of said plurality of sides having a surface;
    an optical fiber mounting element positioned in optical contact with at least one of said plurality of sides; and
    an optical fiber having a first terminal end with a terminal surface, said optical fiber being optically coupled with said optical fiber mounting element so as to position said optical fiber to deliver an EMR from said terminal end through a first surface of said at least one of said plurality of sides into said sample slide to a portion of a second surface of said plurality of sides at a first incident angle, such that when a sample is positioned proximate said second surface, said first incident angle is at least a critical angle for total internal reflection at an interface of said second surface and said sample.

2. A system according to claim 1, wherein said incident angle is selected so that when a sample is positioned proximate said portion of said second surface, said sample is viewable by a microscope at least in part as a result of said EMR, the launch system configured to be positioned proximate said microscope so that said microscope may view said sample.

3. A system according to claim 1, wherein said EMR is divergent from said terminal end, a first subset of said EMR being incident at said second surface such that an incident angle of the first subset is at least a critical angle for TIR, a second subset of said EMR being incident at said second surface such that an incident angle of the second subset is less than a critical angle for TIR.

4. A system according to claim 1, wherein said optical fiber mounting element comprises a material selected from the group consisting of an optical adhesive, glycerol, an optical oil, a prism, a lens, an optical grating, a glass, a plastic, sapphire, a metal, and any combination thereof.

5. A system according to claim 1, wherein said optical fiber mounting element and said sample slide are monolithic.

6. A system according to claim 1, wherein said optical fiber mounting element includes a fiber insertion portal having said optical fiber inserted therein.

7. A system according to claim 1, wherein said first and second surfaces are the same surface.

8. A system according to claim 1, wherein said optical fiber mounting element is configured to allow said optical fiber to be adjusted to a second position.

9. A system according to claim 1, wherein said sample slide has a first index of refraction and said optical fiber mounting element has a second index of refraction, wherein said first and second indices of refraction are substantially the same.

10. A system according to claim 1, wherein said sample slide has a first index of refraction and said optical fiber mounting element has a second index of refraction, wherein said second index of refraction differs from said first index of refraction so that said EMR is delivered at said first surface at said first incident angle.

11. A system according to claim 1, wherein said sample slide has a first index of refraction and said optical fiber mounting element has a second index of refraction, said first incident angle being a function of said first and second indices of refraction.

12. A system according to claim 1, wherein said sample slide is for microscopy of a sample having a first index of refraction, said sample slide having a second index of refraction, said first incident angle being a function of said first and second indices of refraction.

13. A microscope comprising a system according to claim 1.

14. A kit for modifying a microscope to perform TIR microscopy, the kit comprising a system according to claim 1.

15. A system according to claim 1, wherein said sample slide is part of a sample chamber.

16. A sample slide for total internal reflection (TIR) microscopy of a sample, the sample slide comprising:
    a first side having a first surface;
    a second side having a second surface; and
    a fiber insertion portal in said first side, said fiber insertion portal having a fiber insertion axis at a first angle with respect to said second side, said first angle being such that when an optical fiber is inserted within said fiber insertion portal said optical fiber is positioned so to deliver an EMR to said second surface at a second angle, such that when a sample is positioned proximate said second surface, said second angle is at least a critical angle for total internal reflection at an interface of said second surface and said sample.

17. A sample slide according to claim 16, further comprising an optical fiber inserted in said fiber insertion portal.

18. A sample slide according to claim 16, further comprising a coupling medium between said fiber insertion portal and said optical fiber.

19. A microscopy launch system for total internal reflection (TIR) microscopy of a sample having a first index of refraction, the system comprising:
  a sample slide having a plurality of sides, each of said plurality of sides having a surface, said sample slide having a second index of refraction;
  an optical fiber mounting element positioned in optical contact with at least one of said plurality of sides; and
  an optical fiber having a first terminal end having a terminal surface, said optical fiber being optically coupled with said optical fiber mounting element so as to position said optical fiber to deliver an EMR from said terminal end through a first surface of said at least one of said plurality of sides into said sample slide to a portion of a second surface of said plurality of sides at a first incident angle, said first incident angle being a function of said first and second indices of refraction, such that when a sample is positioned proximate said second surface, said first incident angle is at least a critical angle for total internal reflection at an interface of said second surface and said sample.

20. A system according to claim 19, wherein said EMR is divergent from said terminal end, a first subset of said EMR being incident at said second surface such that an incident angle of said first subset is at least a critical angle for TIR, a second subset of said EMR being incident at said second surface such that an incident of said second subset is less than a critical angle for TIR.

21. A total internal reflection (TIR) microscopy launch system for delivering an EMR to a sample slide having a plurality of sides, each of the plurality of sides having a surface, the system comprising:
  an optical fiber mounting element configured to be positioned in optical contact with at least one of said plurality of sides; and
  an optical fiber having a first terminal end having a terminal surface, said optical fiber being optically coupled with said optical fiber mounting element, wherein when said optical fiber mounting element is positioned in optical contact with the sample slide said optical fiber is positioned to deliver an EMR from said terminal end through a first surface of the at least one of the plurality of sides into the sample slide to a portion of a second surface of the plurality of sides at a first incident angle, wherein when a sample is placed proximate said portion said sample is viewable by a microscope at least in part as a result of said EMR, said first incident angle being at least a critical angle for total internal reflection at an interface of said second surface and said sample.

22. A system according to claim 21, wherein said EMR is divergent from said terminal end, a first subset of said EMR being incident at said second surface such that an incident angle of said first subset is at least a critical angle for TIR, a second subset of said EMR being incident at said second surface such that an incident angle of said second subset is less than a critical angle for TIR.

23. A method of performing total internal reflection (TIR) microscopy, the method comprising:
  providing a sample slide having a plurality of sides, each of said plurality of sides having a surface;
  positioning an optical fiber mounting element in optical contact with a first side of said plurality of sides;
  providing a sample in contact with a second side of said plurality of sides; and
  optically coupling a terminal end of an optical fiber with said optical fiber mounting element so as to position said optical fiber to deliver an EMR through said surface of said first side at an interface between said optical fiber mounting element and said sample slide into said sample slide to a portion of said surface of said second side at a desired incident angle that is at least a critical angle for total internal reflection at an interface of said surface of said second side and said sample.

24. A method according to claim 23, further comprising:
  delivering said EMR; and
  observing a fluorescence from said sample.

25. A method according to claim 23, wherein said first and second sides are the same side.

26. A method according to claim 23, wherein said first and second sides are different sides.

27. A method according to claim 23, further comprising performing on said sample total internal reflection (TIR) fluorescence microscopy.

28. A method according to claim 23, wherein said EMR diverges from the terminal end, a first subset of said EMR being incident at said surface of said second side such that an incident angle of the first subset is at least a critical angle for TIR, a second subset of said EMR being incident at said surface of said second side such that an incident angle of the second subset is less than a critical angle for TIR.

29. A method according to claim 23, further comprising adjusting said optical fiber to a second position in said optical fiber mounting element.

30. A method of modifying a sample slide for a total internal reflection (TIR) microscopy technique, the sample slide having a first side and a second side, the second side having a surface, the method comprising:
  optically coupling an optical fiber mounting element with said first side;
  optically coupling a terminal end of said optical fiber with said optical fiber mounting element; and
  positioning said optical fiber in said optical fiber mounting element so as to position said optical fiber to deliver an EMR from a first terminal end of said optical fiber through the first side into the sample slide to the surface of the second side at an incident angle, such that when a sample is positioned proximate the surface of the second side, the incident angle at least a critical angle for total internal reflection at an interface of said surface of said second side and said sample.

31. A method according to claim 30, wherein said EMR diverges from the first terminal end, a first subset of said EMR being incident at said surface of said second side such that an incident angle of the first subset is at least a critical angle for TIR, a second subset of said EMR being incident at said surface of said second side such that an incident angle of the second subset is less than a critical angle for TIR.

32. A method according to claim 30, further comprising adjusting said optical fiber to a second position in said optical fiber mounting element.

33. A method according to claim 30, wherein said first and second sides are the same sides.

34. A method of modifying a sample slide for total internal reflection (TIR) microscopy, the sample slide having a first side and a second side, said second side having a first surface, the method comprising:

positioning an optical fiber at a first position, said optical fiber having a terminal end with a terminal surface, said first position being proximate said first side so as to position said optical fiber to deliver an EMR from said first terminal end to said first surface at a first incident angle, such that when a sample is positioned proximate said first surface, said first incident angle is at least a critical angle for TIR at an interface of said first surface and said sample.

35. A method according to claim 34, further comprising:

optically coupling an optical fiber mounting element with said first side; and optically coupling a terminal end of said optical fiber with said optical fiber mounting element.

36. A method according to claim 34, wherein said first and second sides are the same sides.

37. A method of modifying a microscope for a total internal reflection (TIR) microscopy technique, the method comprising:

providing a sample slide having a first side and a second side, said second side having a first surface;

optically coupling an optical fiber mounting element with said first side;

optically coupling a terminal end of said optical fiber with said optical fiber mounting element; and positioning said optical fiber at a first position with said optical fiber mounting element so as to position said optical fiber to deliver an EMR from a first terminal end of said optical fiber through the first side into the sample slide to said first surface at a desired incident angle, such that when a sample is positioned proximate said first surface, said desired incident angle is at least a critical angle for total internal reflection at an interface of said first surface and said sample.

* * * * *